United States Patent
Fuchs et al.

(10) Patent No.: US 10,248,477 B2
(45) Date of Patent: *Apr. 2, 2019

(54) SYSTEM, METHOD AND COMPUTER PROGRAM PRODUCT FOR SHARING INFORMATION IN A DISTRIBUTED FRAMEWORK

(71) Applicant: Stragent, LLC, Longview, TX (US)

(72) Inventors: Axel Fuchs, San Jose, CA (US); Scott Sturges Andrews, Petaluma, CA (US)

(73) Assignee: Stragent, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,949

(22) Filed: Oct. 1, 2018

(65) Prior Publication Data
US 2019/0034250 A1 Jan. 31, 2019

Related U.S. Application Data

(63) Continuation of application No. 16/042,159, filed on Jul. 23, 2018, and a continuation of application No. (Continued)

(51) Int. Cl.
*G06F 9/54* (2006.01)
*H04L 12/26* (2006.01)
(Continued)

(52) U.S. Cl.
CPC .......... *G06F 9/546* (2013.01); *B60R 16/0231* (2013.01); *G06F 9/54* (2013.01); (Continued)

(58) Field of Classification Search
CPC .......... G06F 9/542; G06F 9/545; G06F 9/546; H04L 43/10; H04L 67/10; B60R 16/0231
See application file for complete search history.

(56) References Cited

U.S. PATENT DOCUMENTS 5,956,489 A * 9/1999 San Andres ........ G06F 11/1662
709/221

OTHER PUBLICATIONS

Notice of Allowanced dated Jun. 27, 2018 for U.S. Appl. No. 15/919,201.

* cited by examiner

*Primary Examiner* — Charles E Anya

(57) ABSTRACT

A system, method and computer program product are provided for sharing information in an automobile vehicle comprising: receiving information in the form of a packet data unit representing datum information carried by an overall message from a first physical network selected from the group consisting of FlexRay, Controller Area Network, Local Interconnect Network and Media Oriented Systems Transport; in response to the receipt of the information, issuing a storage resource request in connection with a storage resource; determining whether the storage resource is available for storing the information; determining whether a threshold has been reached in association with the storage resource request; in the event the storage resource is not available and the threshold associated with the storage resource request has not been reached, issuing another storage resource request in connection with the storage resource; in the event the storage resource is available, storing the information in the storage resource; and sharing the stored information with at least one of a plurality of heterogeneous processes including at least one process associated with a second physical network selected from the group consisting of FlexRay, Controller Area Network, Local Interconnect Network and Media Oriented Systems Transport, utilizing a network protocol different from a protocol of the first physical network.

30 Claims, 17 Drawing Sheets

Related U.S. Application Data

15/919,201, filed on Mar. 12, 2018, now Pat. No. 10,031,790, which is a continuation of application No. 15/405,110, filed on Jan. 12, 2017, now Pat. No. 10,002,036, which is a continuation of application No. 14/011,705, filed on Aug. 27, 2013, now Pat. No. 9,575,817, which is a continuation of application No. 13/531,319, filed on Jun. 22, 2012, now Pat. No. 8,566,843, which is a continuation of application No. 12/182,570, filed on Jul. 30, 2008, now Pat. No. 8,209,705, which is a continuation of application No. 10/737,690, filed on Dec. 15, 2003, now Pat. No. 7,802,263.

(60) Provisional application No. 60/434,018, filed on Dec. 17, 2002.

(51) Int. Cl.
*H04L 29/06* (2006.01)
*H04L 29/08* (2006.01)
*B60R 16/023* (2006.01)

(52) U.S. Cl.
CPC ............ *G06F 9/542* (2013.01); *G06F 9/545* (2013.01); *H04L 43/04* (2013.01); *H04L 43/06* (2013.01); *H04L 43/08* (2013.01); *H04L 43/10* (2013.01); *H04L 67/02* (2013.01); *H04L 67/10* (2013.01); *H04L 67/12* (2013.01); *G06F 2209/547* (2013.01); *H04L 65/102* (2013.01)

US 10,248,477 B2

SYSTEM, METHOD AND COMPUTER PROGRAM PRODUCT FOR SHARING INFORMATION IN A DISTRIBUTED FRAMEWORK

RELATED APPLICATION(S)

This application is a continuation of U.S. patent application Ser. No. 16/042,159 filed Jul. 23, 2018, which is a continuation of U.S. patent application Ser. No. 15/919,201 filed Mar. 12, 2018, now U.S. Pat. No. 10,031,790, which is a continuation of U.S. patent application Ser. No. 15/405,110 filed Jan. 12, 2017, now U.S. Pat. No. 10,002,036, which is continuation of U.S. patent application Ser. No. 14/011,705 filed Aug. 27, 2013, now U.S. Pat. No. 9,575,817, which is a continuation of U.S. patent application Ser. No. 13/531,319 filed Jun. 22, 2012, now U.S. Pat. No. 8,566,843, which is a continuation of U.S. patent application Ser. No. 12/182,570 filed Jul. 30, 2008, now U.S. Pat. No. 8,209,705, which is a continuation of U.S. patent application Ser. No. 10/737,690 filed Dec. 15, 2003, now U.S. Pat. No. 7,802,263, which, in turn, claims priority under 35 U.S.C. § 119 based on U.S. Provisional Application No. 60/434,018 filed Dec. 17, 2002, all of which are incorporated herein by reference.

FIELD AND BACKGROUND OF THE INVENTION

The present invention relates to the field of distributed control and monitoring systems that may include certain temporal behavior.

Such technology may optionally apply to electronic vehicle communication and control systems, real-time monitoring systems, industrial automation and control systems, as well as any other desired system.

SUMMARY OF THE INVENTION

A system, method and computer program product are provided for sharing information in an automobile vehicle comprising: receiving information in the form of a packet data unit representing datum information carried by an overall message from a first physical network selected from the group consisting of FlexRay, Controller Area Network, Local Interconnect Network and Media Oriented Systems Transport; in response to the receipt of the information, issuing a storage resource request in connection with a storage resource; determining whether the storage resource is available for storing the information; determining whether a threshold has been reached in association with the storage resource request; in the event the storage resource is not available and the threshold associated with the storage resource request has not been reached, issuing another storage resource request in connection with the storage resource; in the event the storage resource is available, storing the information in the storage resource; and sharing the stored information with at least one of a plurality of heterogeneous processes including at least one process associated with a second physical network selected from the group consisting of FlexRay, Controller Area Network, Local Interconnect Network and Media Oriented Systems Transport, utilizing a network protocol different from a protocol of the first physical network.

DETAILED DESCRIPTION

Figure 1:
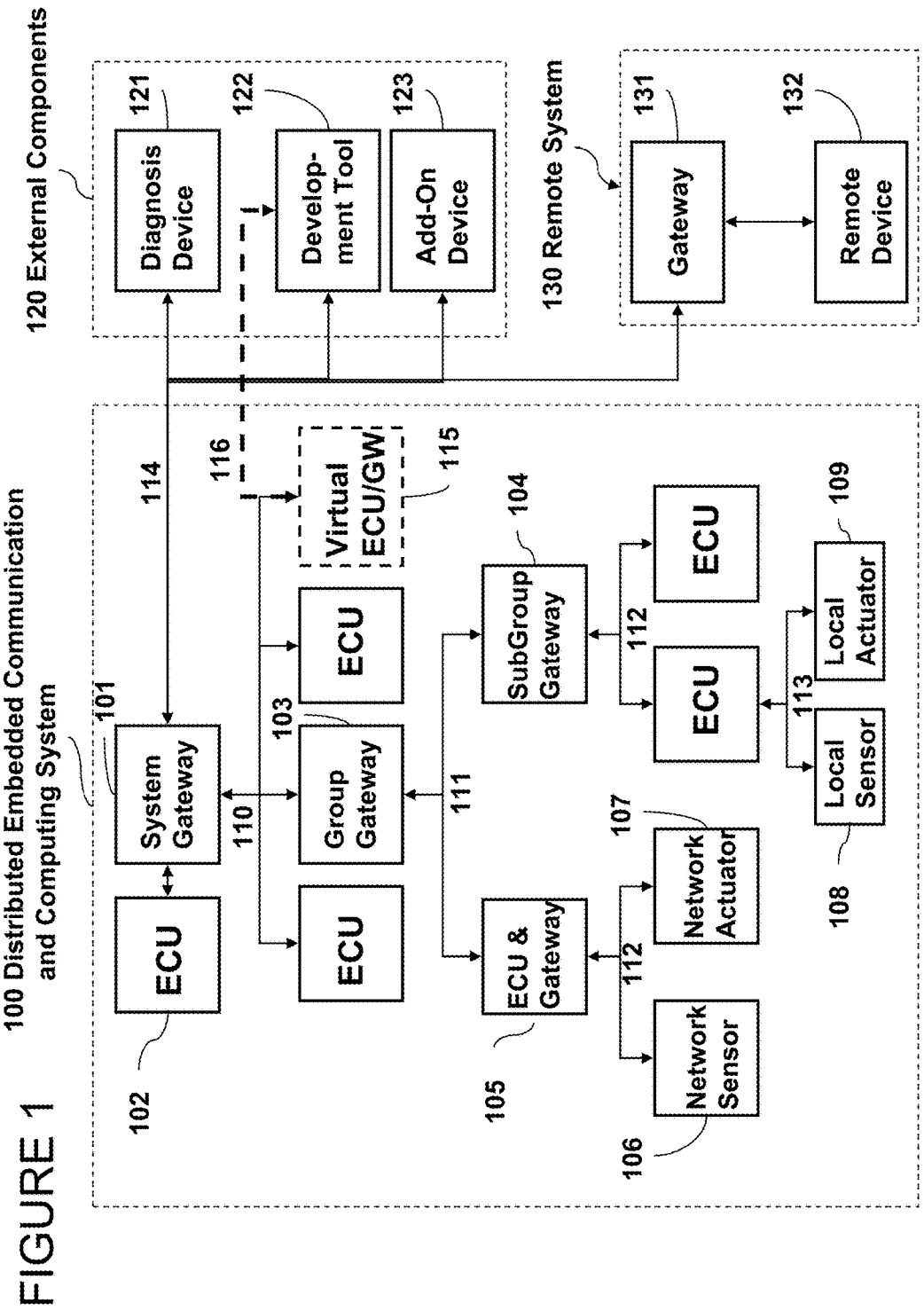
FIG. 1 is a block diagram of an embodiment of a system of one embodiment.

FIG. 1 is a block diagram generally depicting elements of an embodiment of the present distributed embedded communication and computing system. The system architecture may be situated in automotive electronics or industrial control and monitoring systems. In an automotive environment, the various Electronic Control Units (ECUs, 102) control complex applications such as engine control, brake control, or diagnostics. They are either connected to sensors and actuators via discrete links or simple standard functions such as sensors and actuators are organized into separate sub networks.

These complex functions such as braking, engine-control, etc. are then grouped into the backbone system functions for the car, such as body control, power train and chassis. The backbone also includes the vehicle's high level functions such as diagnostics, telematics and entertainment systems.

Therefore the system is typically hierarchically organized and includes a variety of gateways (101,104,105), which relay messages up and down through the system layers. Each layer may contain multiple electronic control units (ECU, 102) that are connected through wired serial multiplexing bus-systems such as Controller Area Network (CAN or ISO11898), Flexray, LIN, J1850, J1708, MOST, IEEE1394, and other similar serial multiplexing buses or through wireless multiplexing systems such as IEEE802.11, IEEE802.15, Bluetooth, Zigbee, or similar other wireless links.

Typically, functions provided by an ECU (102) are bound to hard real-time temporal behavior. In the context of the present description, real-time may include any response time that may be measured in milli- or microseconds, and/or is less than 1 second.

The ECU may receive a set of real-time input variables from local sensors (108), which are connected via discrete signal lines (113), or from networked sensors (106), which are connected through a multiplexing bus-system (112). The ECU may also share variables with other ECUs (102) that are either connected on the same physical multiplexing bus or that it can reach through a gateway (101,103,104).

Then the ECU (102) processes the input variables and generates a set of output variables that are either shared with other ECUs (102) as described above, or which are output to local actuators (109), which are connected via discrete signal lines (113), or to networked actuators, which are connected through a multiplexing bus (112). ECUs (102) typically share information with devices that are connected on the same physical multiplexing system. This method of information sharing is called horizontal information sharing in a hierarchical system. Gateways (101,103,104) link multiple physical multiplexing systems together. In the context of the present description, such information may include data, a signal, and/or anything else capable of being stored and shared.

The highest level in the hierarchical system is the system level. The system level gateway (101) may be connected to ECUs on the system level multiplexing bus (117), to subsequent gateways (103) that also link to subsequent communication buses (110), and to external components (120) that may contain diagnostics devices (121), development tools (122), other add-on devices (123) or other instances of distributed embedded communication and computing systems (100). In addition, the system gateway (101) may also be connected to an external gateway (131) that may link the system to a remote device (132) through wireless or wired wide-area-networks such as the Internet, using standard protocols such as UDP/IP, TCP/IP,RTP,HTTP, SOAP, JAVA, etc. or nonstandard proprietary protocols.

Subsequent to the system level may be several layers of groups and subgroups that are link to the higher levels via gateways (101,103,104,105).

During the design-time of the system, not all ECUs may exist. Therefore, the development tool (122) may provide a plug-in component or virtual ECU/GW (115) that directly links into the wired multiplexing bus or wireless network (110) and also allows for separate control functions via a tool-link (116).

Figure 2:
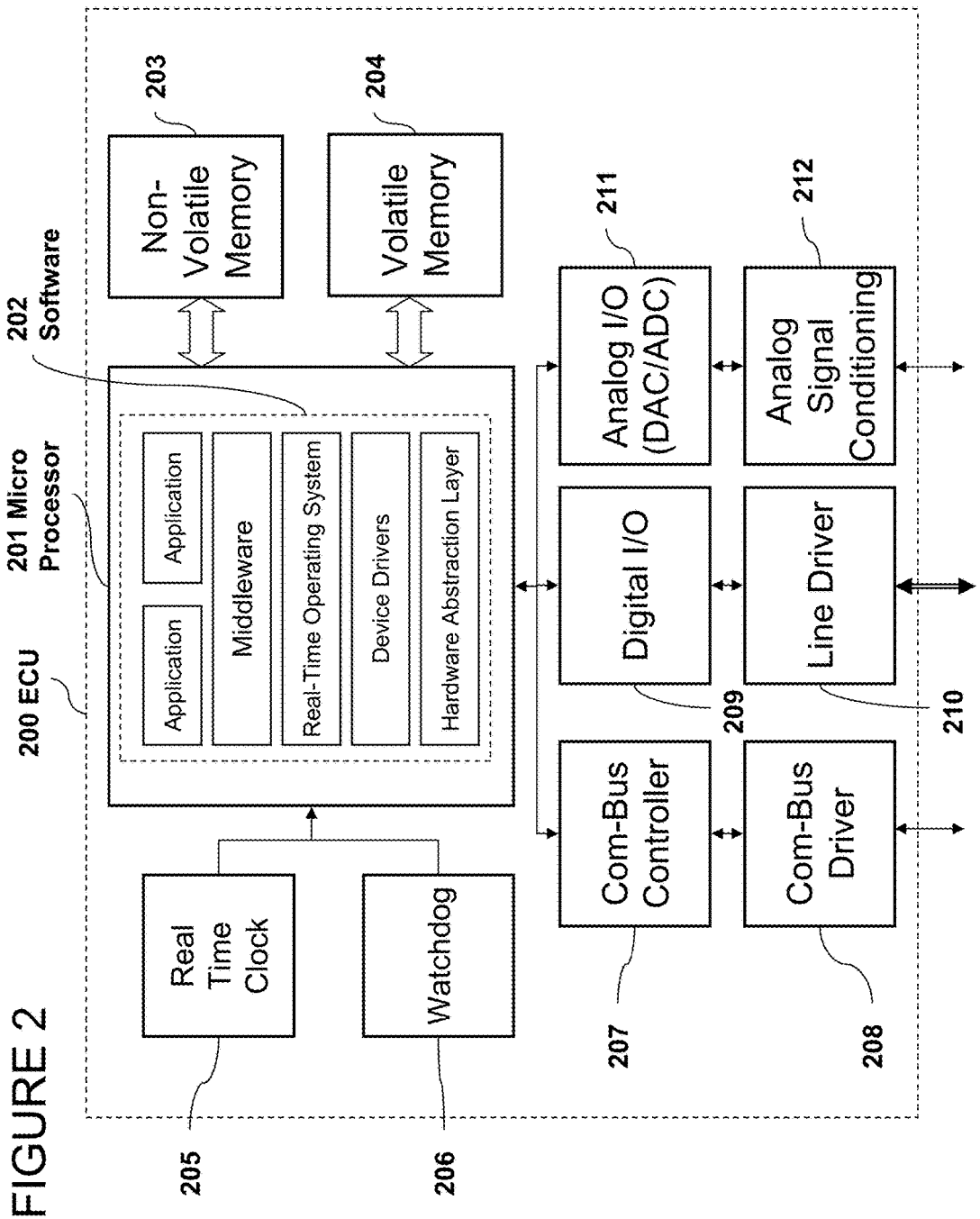
FIG. 2 is a block diagram generally depicting an embodiment of an ECU as part of the system illustrated in FIG. 1.

The block diagram in FIG. 2 depicts the detailed elements within a generic ECU (200) that is one embodiment of ECU (102). The ECU (200) typically contains a micro-processor (201), volatile memory (204) such as RAM, S-RAM or similar, non-volatile memory (203) such as EEPROM, FLASH, etc., a real time clock for internal timing of processes (205), a watchdog (206) to maintain the health of the system, one or more communication bus controllers (207) with associated drivers (208), digital I/O (209) with line drivers (210), and analog I/O (211) with associated analog signal conditioning (212).

Figure 3:
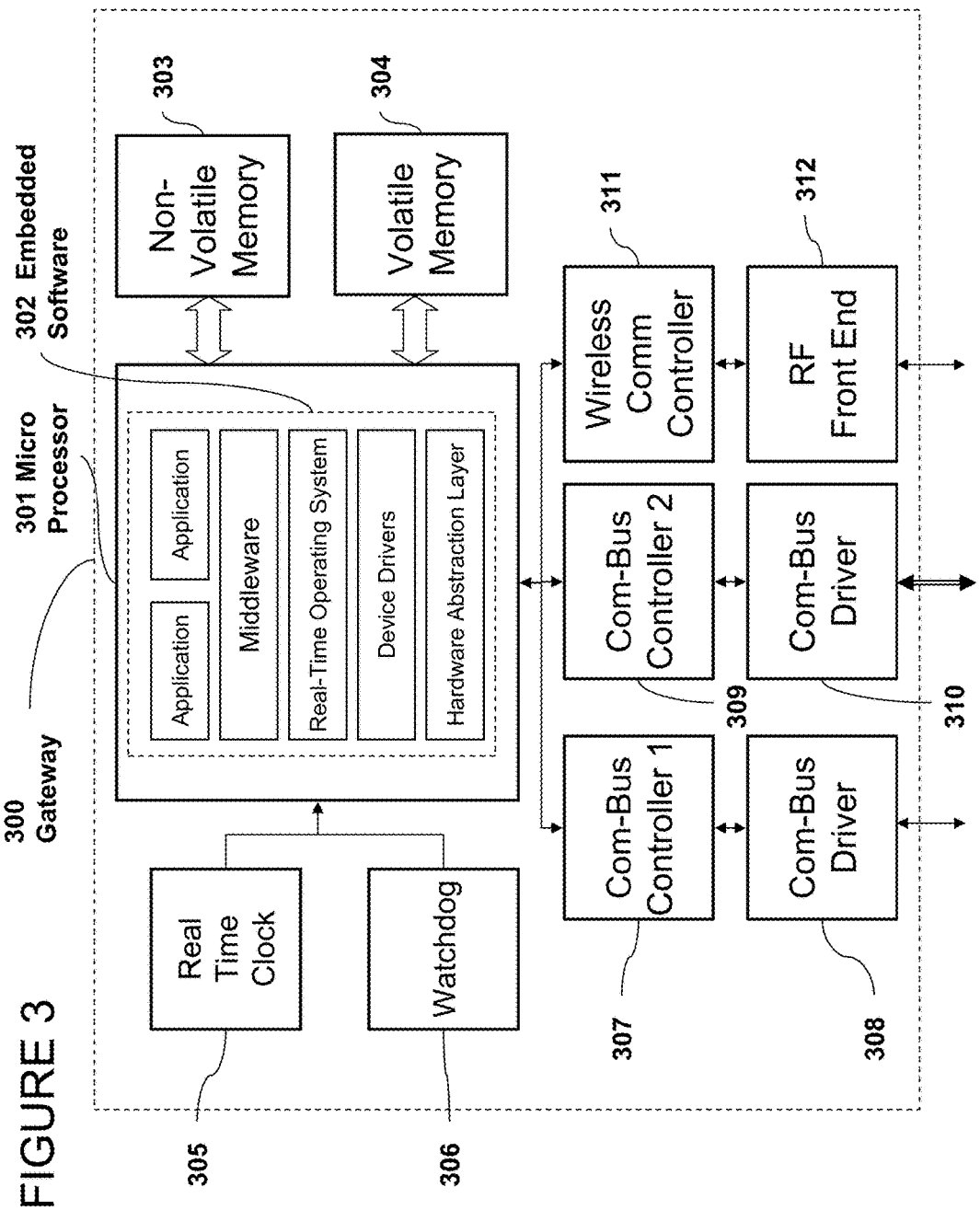
FIG. 3 is a block diagram generally depicting an embodiment of a Gateway device as part of the system illustrated in FIG. 1.

In an alternate embodiment, the ECU (200) may also contain a wireless communication controller (311) and a RF-Front-end (312) as outlined in FIG. 3. The software (202) can either be stored in local non-volatile memory (203) or partially downloaded via the communication link (207,208) and stored in the volatile memory. The software is then executed in the microprocessor (201).

The block diagram FIG. 3 depicts the detailed elements within a generic gateway (300) that is one embodiment of Gateway (101,103,104,105) in FIG. 1.

Figure 4:
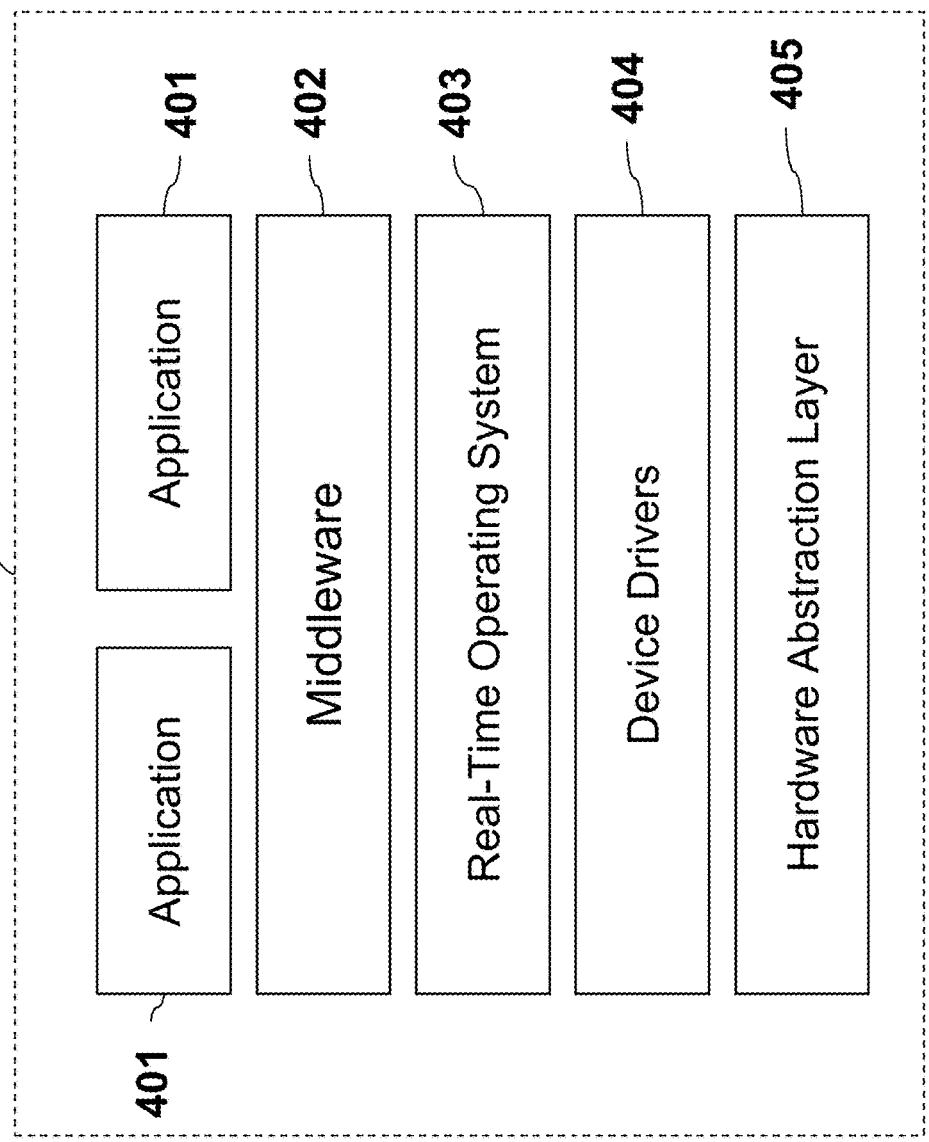
FIG. 4 is a block diagram of an embodiment of the software architecture assumed for one embodiment.

FIG. 4 outlines one embodiment of the software architecture in an embedded system. The hardware abstraction layer (405) allows the system developer to adapt a standard operating system to a specific hardware as used in an ECU (200) or gateway (300). The hardware abstraction layer (405) adapts the real-time operating system (403) and the device drivers (404) to a specific hardware implementation.

One embodiment includes the middleware (402) that has direct access to the real-time operating system (403), the device drivers (404) and the hardware abstraction layer (405). The middleware isolates the application from input/output functions and allows multiple applications to share common variables locally. In addition, the middleware lets applications share variables with remote applications/processes. In the context of the present description, a process may refer to any hardware and/or software operation, etc.

In one embodiment, the middleware can directly interface with the input/output mechanisms of the hardware without utilizing an operating system (403) or hardware abstraction layer (405).

Another embodiment of the middleware utilizes a preemptive multitasking operating system with explicit control of resources. In an alternate embodiment, the middleware can be built with a static multitasking scheme with implicit resource management or be part of a single task system.

Figure 5:
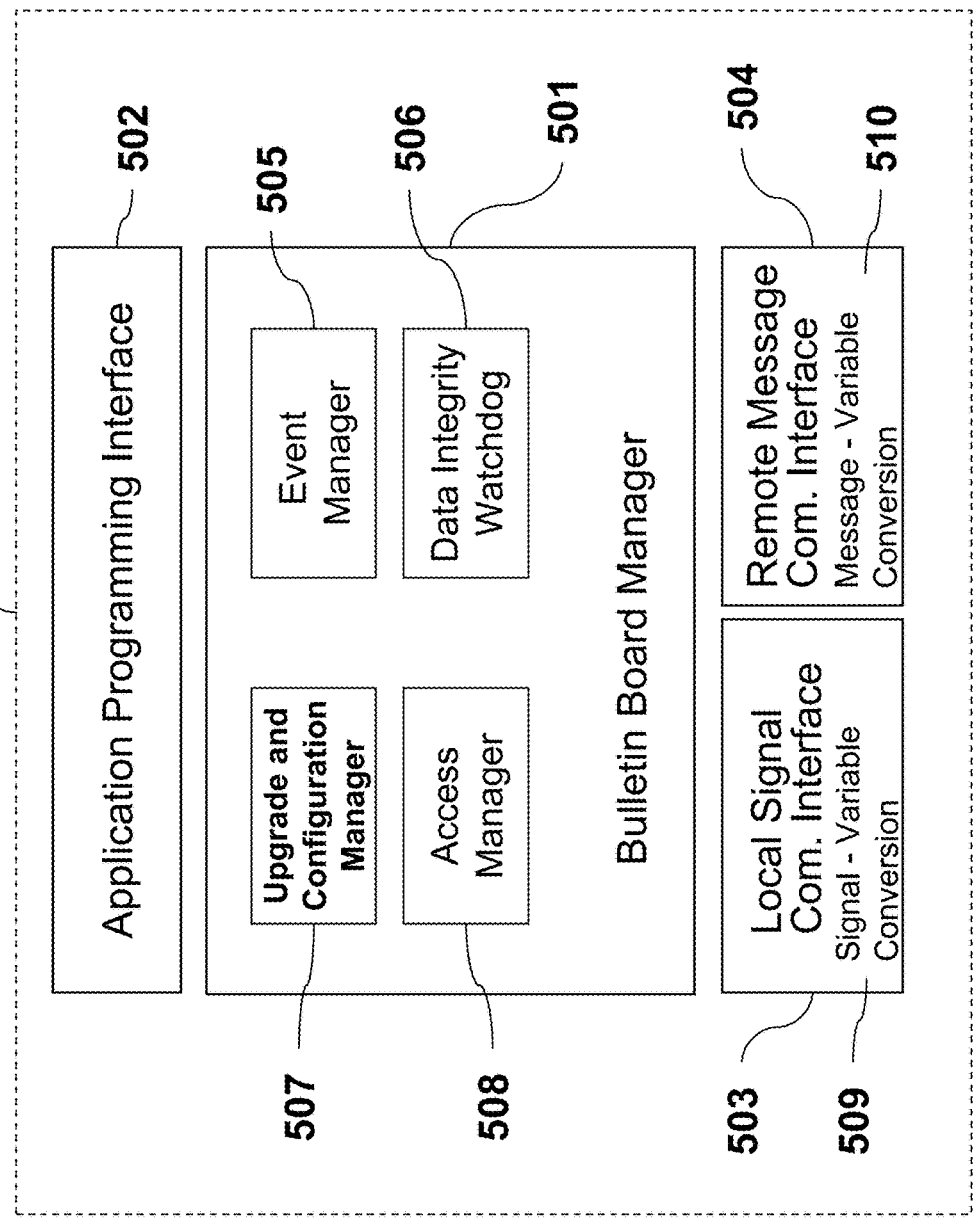
FIG. 5 is a block diagram of an embodiment of the middleware that contains the methods of one embodiment.

Referring now to FIG. 5, the middleware (402) contains the bulletin board manager (501), a local signal communication interface (503), a remote message communication interface (504), and an application programming interface (502). The application interface (502) provides methods and data interfaces to a plurality of applications. In one embodiment, the application interface is an object library that can be linked to an application at design time.

The bulletin board manager (501) contains an upgrade and configuration manager (507), an event manager (505), a data access manager (508), and a data integrity watchdog (506). The upgrade and configuration manager (507) is necessary to configure the data structure of the bulletin board and to make executable code available to individual processing nodes. In the context of the present description, the bulletin board may refer to any database that enables users to send and/or read electronic messages, files, and/or other data that are of general interest and/or addressed to no particular person/process.

The access manager provides access control mechanisms for the code update and configuration mode. It also may control access rights for individual applications at execution time in the run mode.

The event manager (505) captures input-output events as variables and generates new events, flags, or signals based on operations on state variables in the bulletin board. Such operations may include test of maximum values, the occurrence of logically combined events, the result of an integrity check, or events and signals that are created based on any other logical or arithmetic computation on the state variables that are stored in the bulletin board. The actual processing of data and manipulation of data may be done in the application that uses the middleware (402). The data integrity watchdog analyses the stored state variables for its integrity and generates events or flags if any problem occurs.

The local signal communication interface (503) interfaces with the local discrete input/output hardware to update the bulletin board with new variables and to update the input/output interfaces with the state variables from the bulletin board. It also converts state variables to input/output signals and input/output signals to state variables that can be stored in the bulletin board. The conversion process may contain scaling of signals as well as offset compensation. Typically this processing helps to convert I/O signals that are measured in Volt to a physical entity and vice versa. The communication with the local discrete input output system can be triggered by events or signals can be sampled time-triggered based on a cyclic global or local time base.

The remote message communication interface (504) interfaces to serial multiplexing interfaces (buses) that are connected to the specific processing node (ECU or Gateway). It extracts variables from a plurality of messaging protocols and stores them in the database. It also replicates local bulletin-board state variables to the associated processing nodes by composing the appropriate messages for each communication link. The message transfer can be initiated triggered by a bus event, by a local event, or by a time-triggered mechanism that uses a cyclic local or global time base.

Figure 6:
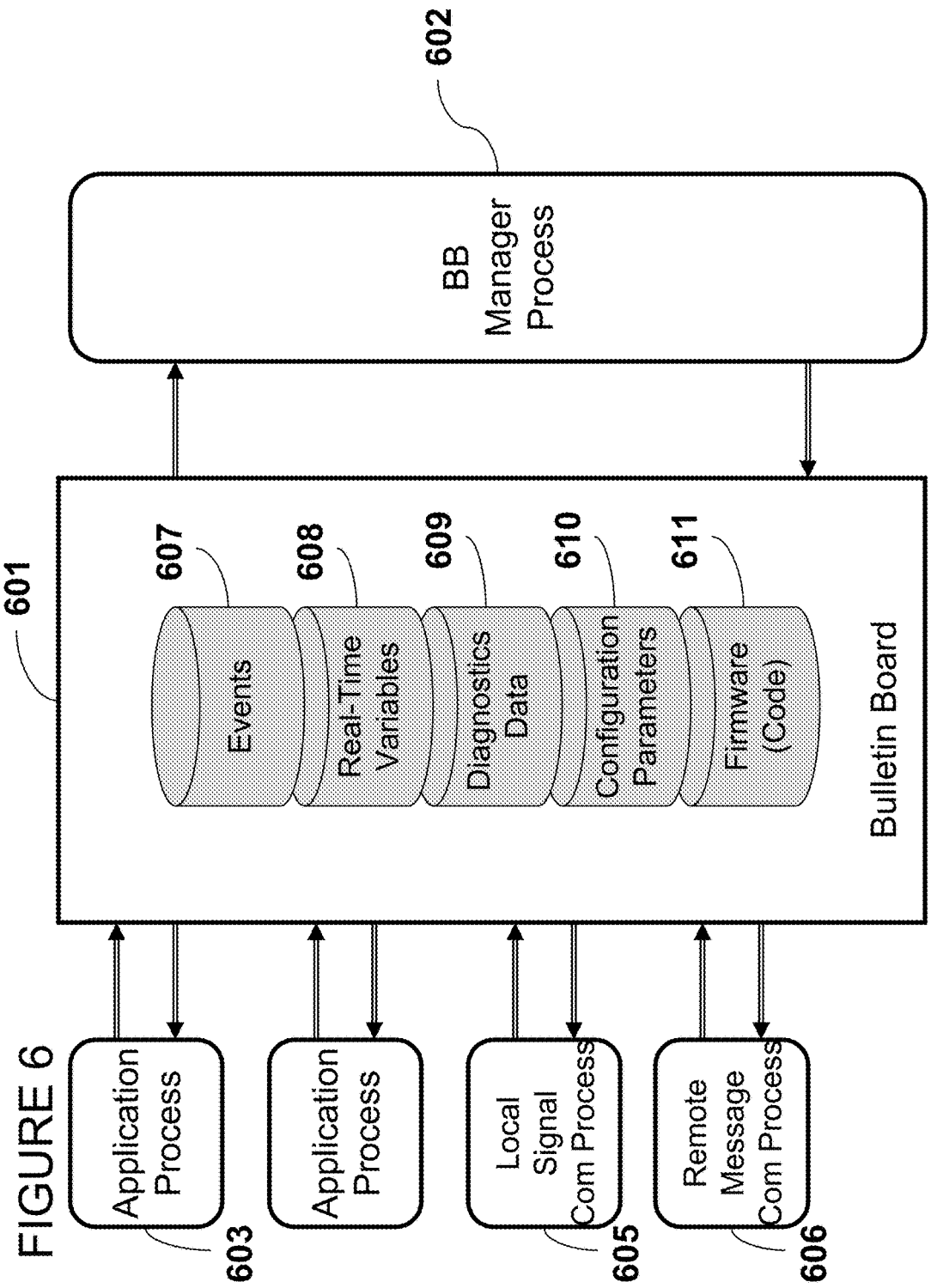
FIG. 6 is a block diagram of an embodiment of the bulletin board that describes the process interaction of one embodiment.

FIG. 6 shows the concept of an extended bulletin board or an embedded real-time database (601). In this embodiment the ECU (102) or the Gateway (101) hosts one or multiple bulletin boards with relational links between the variables in the bulletin boards. The relations are defined by data processing functions that the gateway can operate on bulletin boards to obtain new information that can be stored in yet another bulletin board.

The bulletin board (601) may contain but is not limited to events (607), real-time variables (608), diagnostics data (609), configuration parameters (610), and firmware (611) to upgrade individual components of the executable code or the entire software of a processing node. Each type of information may include one or more sections so that individual processes are not blocked if they access separate sections of data.

The memory of the bulletin board is subdivided into areas that nodes on each external network can read from and write into and other areas that an external network may only read from. The data contained in the bulletin board may be stored in volatile or non-volatile memory. Each data entry may consist of one value or an array of values that also may represent a time series.

In one embodiment, each application process (603), local signal communication process (605), remote message communication process, and the bulletin manager (602) can individually access the bulletin board using operating system functions for resource management that may include semaphores, events, signals, call-back routines, flags, etc. in an alternate embodiment of the system the bulletin-board manager controls all interaction with the bulletin-board and all applications have to pass data to the bulletin-board manager. This approach simplifies the interaction with the bulletin board, but adds delay time and jitter to the state variables.

At design time, various hierarchies of memory management can be applied. In practice it is more efficient to allow each sub network and subsystem to place system variable data into local bulletin boards. This is because many system variables are primarily used only within their subsystem or sub network. By placing local information in a shared memory (local bulletin board), it can be used by multiple processes on this processor node. A group bulletin board allows devices on a sub-network to share information with a minimum of network traffic. A system bulletin board allows access to system-wide variables and information.

Figure 7:
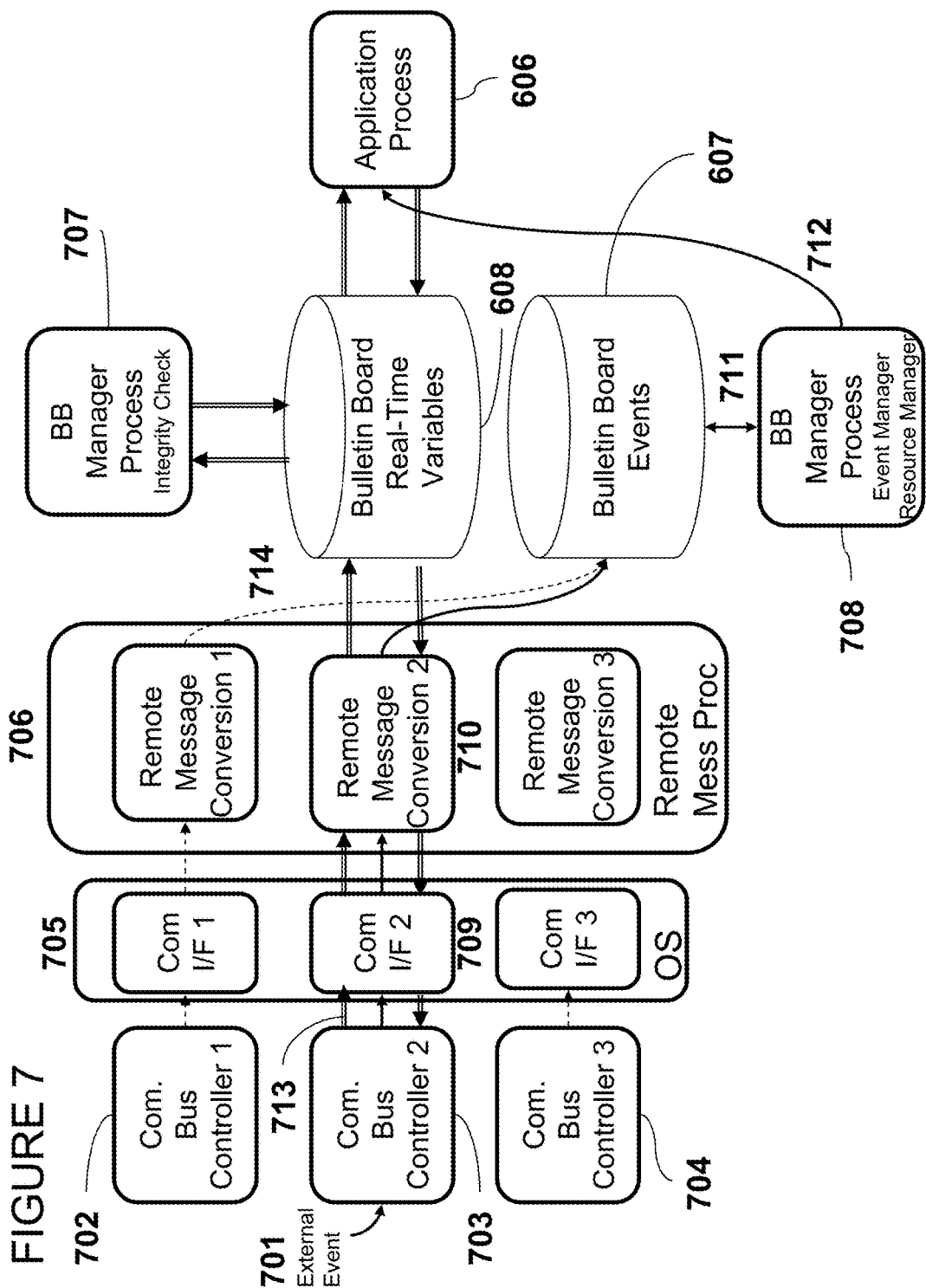
FIG. 7 is a block diagram of an embodiment of the bulletin board that describes the process interaction with multiple external communication buses as part of one embodiment.

FIG. 7 illustrates the logical architecture of the interconnection between three heterogeneous network controllers (702, 703, 704), the associate Operating System interfaces (705), the remote message communication process (706), the bulletin board (608), and the application process (606). The connection to each communication controller is fundamentally implemented at the physical interface (the wire, fiber or electromagnetic wireless interface). Each of the higher level layers (data link, network, etc) in the communication interface (705) deals with specific features of the individual communication process. In practice these layers are typically represented in a message by "header" bits that contain information about that layer of the network being used to send the message.

Using this model, each communicated message may be processed at each layer to remove (and use) the associated header information for that level. Once all layers are processed the remaining packet data unit (PDU) represents the datum or core information carried by the overall message. In one embodiment, each communication controller has an associated communication interface and an associated remote message conversion mechanism. For instance communication bus controller 2 (703) has an associated communication interface 2 (709), and an associated remote message conversion 2 (710).

This arrangement allows the remote message process (706) to directly access information at the data link layer and interface it with the bulletin board. A network layer is not necessary. The remote message communication process (706) has a multi-network access interface (essentially a processing capability that can interpret and apply the header information for a variety of networks) and the bulletin board read/write memory access. Now, the individual processing nodes do not need to know about the existence of multiple networks. Each variable can be accessed from all connected physical networks in their proprietary format. Thus the normalization of the information has only to be handled at the gateway through replication of stored data to multiple attached networks.

Continuing with FIG. 7, the communication procedure is described. In the given example, an external event (701) on communication controller 2 (703) triggers the operating system to notify the remote message communication process (706) that data is available. The notification may be a flag, a call-back routine, an event, or any other operating signal. The associated remote message conversion method 2 (710) extracts the data (e.g. real time variables) from the message PDU and stores the data in the bulletin board (608). It may also store the associated event as variable in the bulletin board and signal the bulletin-board event manager that new data is available.

The bulletin event manager then notifies the application process (606) with the appropriate mechanism. In addition, the event manager may trigger the sampling of local signals using the local signal communication process (605) described in FIG. 6. Finally the bulletin event manager may trigger the bulletin board manager (707) to perform integrity checks or generate additional events based on the change of the state variables.

One embodiment provides a new mechanism for creating an information interconnection between two or more heterogeneous communication networks. In the context of the present description, heterogeneous networks may refer to any different communication networks with at least one aspect that is different.

The approach uses a common, or shared storage system that is connected to all of the system networks through network interfaces. A critically important feature of the bulletin board approach is that the complexity of the bulletin board grows linearly with the number of networks (as opposed to as N(N−1) for the gateway approach), and in one-to-many situations the number of message transformations is half that of the standard networking approach.

In an alternate embodiment of the remote message communication process (706) any remote process can access data via a single network interface. This approach requires a network layer in each processing node and therefore adds overhead to communications. To communicate between two heterogeneous networks, this process may then be repeated in reverse by adding back the header information for the various layers of the second network, and eventually putting the message onto the second network's physical link. The remote message communication manager (706) then can be simplified to only one message assembly and disassembly mechanism.

FIGS. 8-17 illustrate the method of operation of one embodiment of the present system, and also refer to aspects and elements one embodiment shown in FIGS. 1 through 7.

Figure 8:
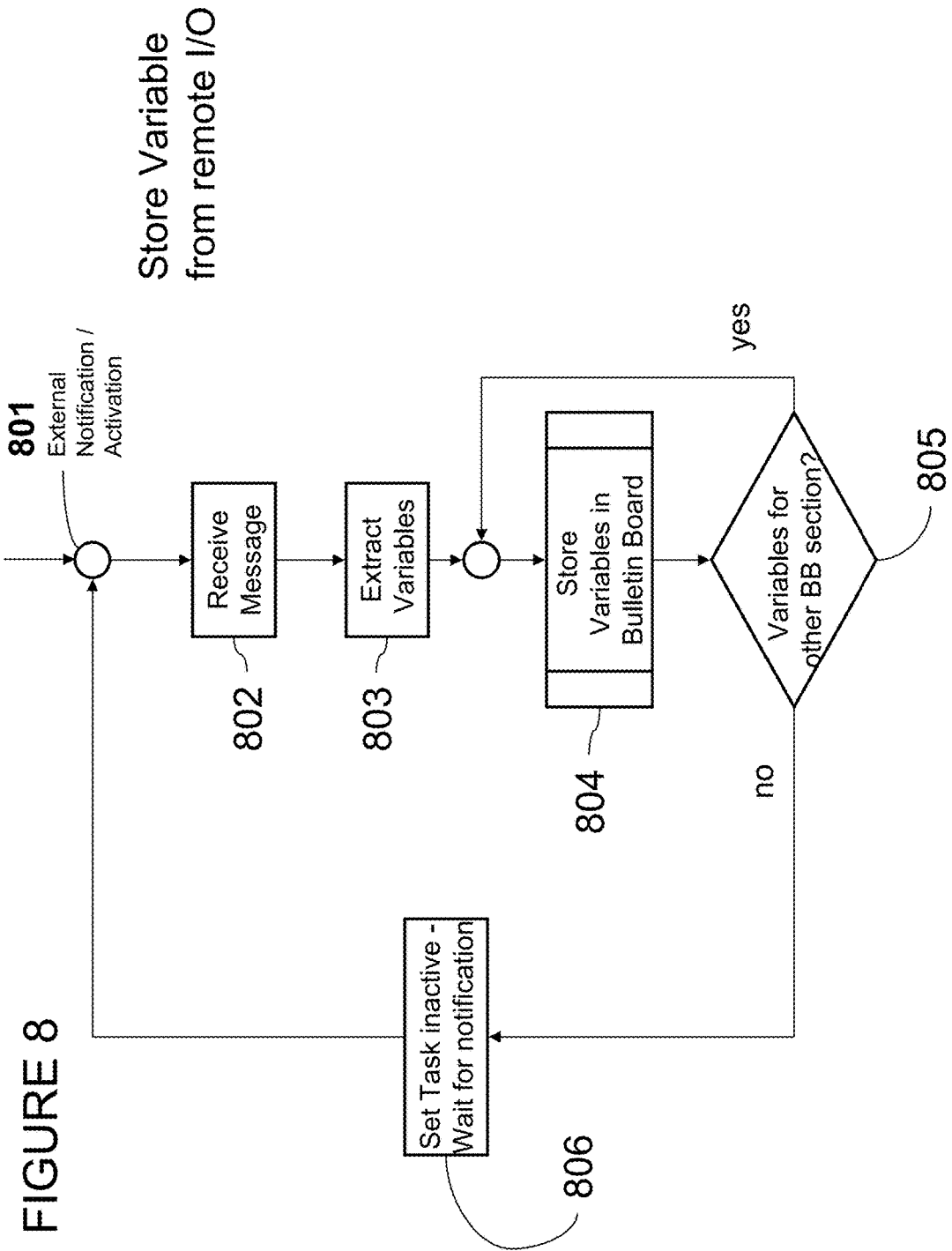
FIG. 8 is a flow chart diagram of an embodiment of the variable store from remote I/O method of one embodiment.

FIG. 8 details the remote messaging process (706) described in FIG. 7. Referring now to FIG. 8, the core process of storing data from remote processes that are communicated through multiplexed communication links, into the bulletin board is described. An external notification or task activation starts the process. Then a message (802) is received from the operating system layer.

In an alternate embodiment, the message is directly copied form the input register of the communication controller. Then the process extracts variables from the message. Additional signal adaptation may be necessary. The sub-process 804 stores the variables in the bulletin board. If the process only updates one section of the bulletin board it waits for the next message notification (806). If variables in multiple sections need to be updated, the process repeats (804).

Figure 9:
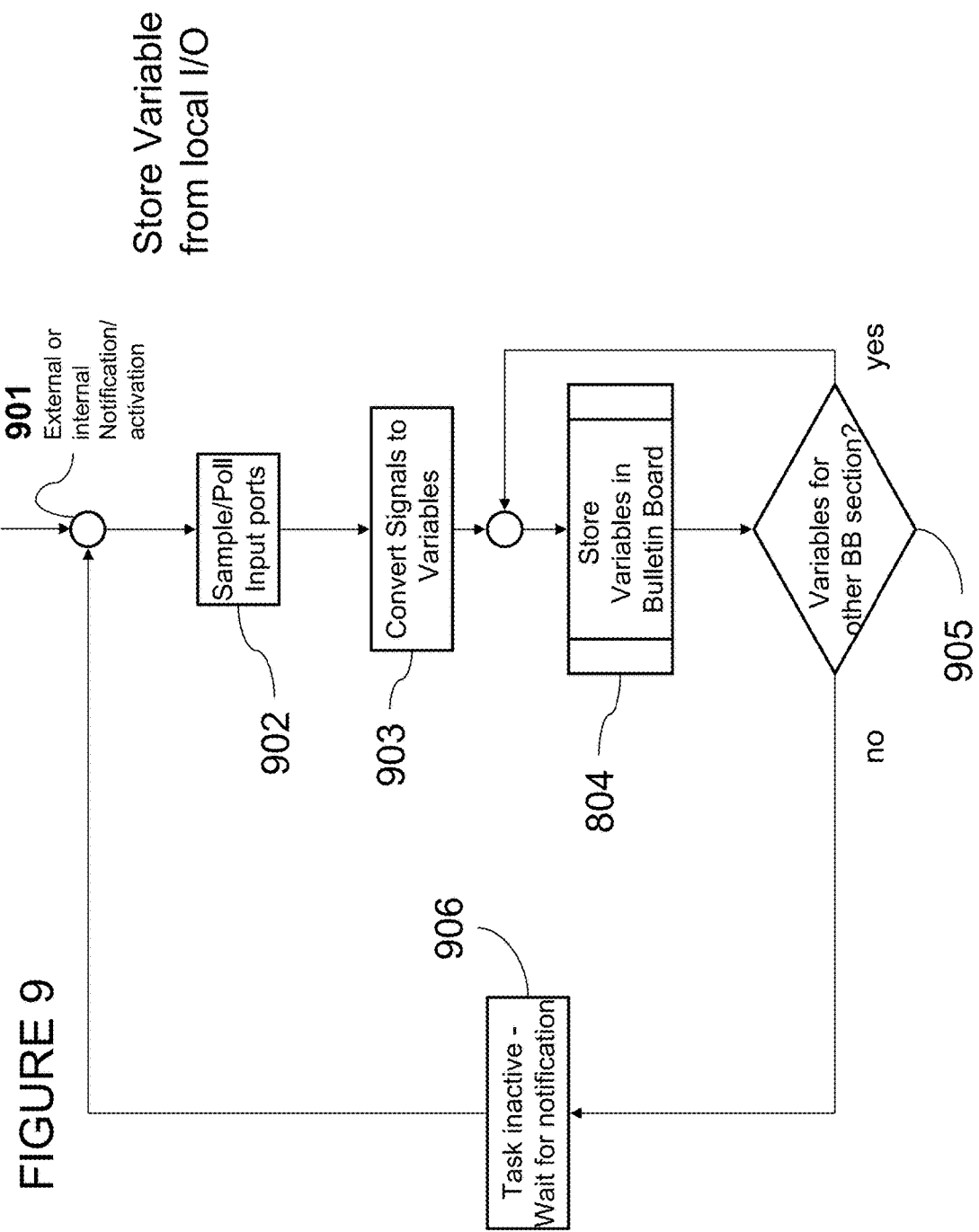
FIG. 9 is a flow chart diagram of an embodiment of the variable store from local I/O method of one embodiment.

FIG. 9 shows the data update from local input/output peripherals. The process starts with an internal or external notification or task activation. Typically this process is repeated cyclic triggered by an internal or external real-time clock. When the process is activated, it samples or polls the local input ports that may include analog and digital signals (902). Then it converts these signals to real-time variables by using the conversion parameters stored in the bulletin board. The signal conditioning parameters van either be defined at design time or adaptively updated by the application process. Then the process stored the new state variables in the bulletin board using the sub-process (804) described above.

Figure 10:
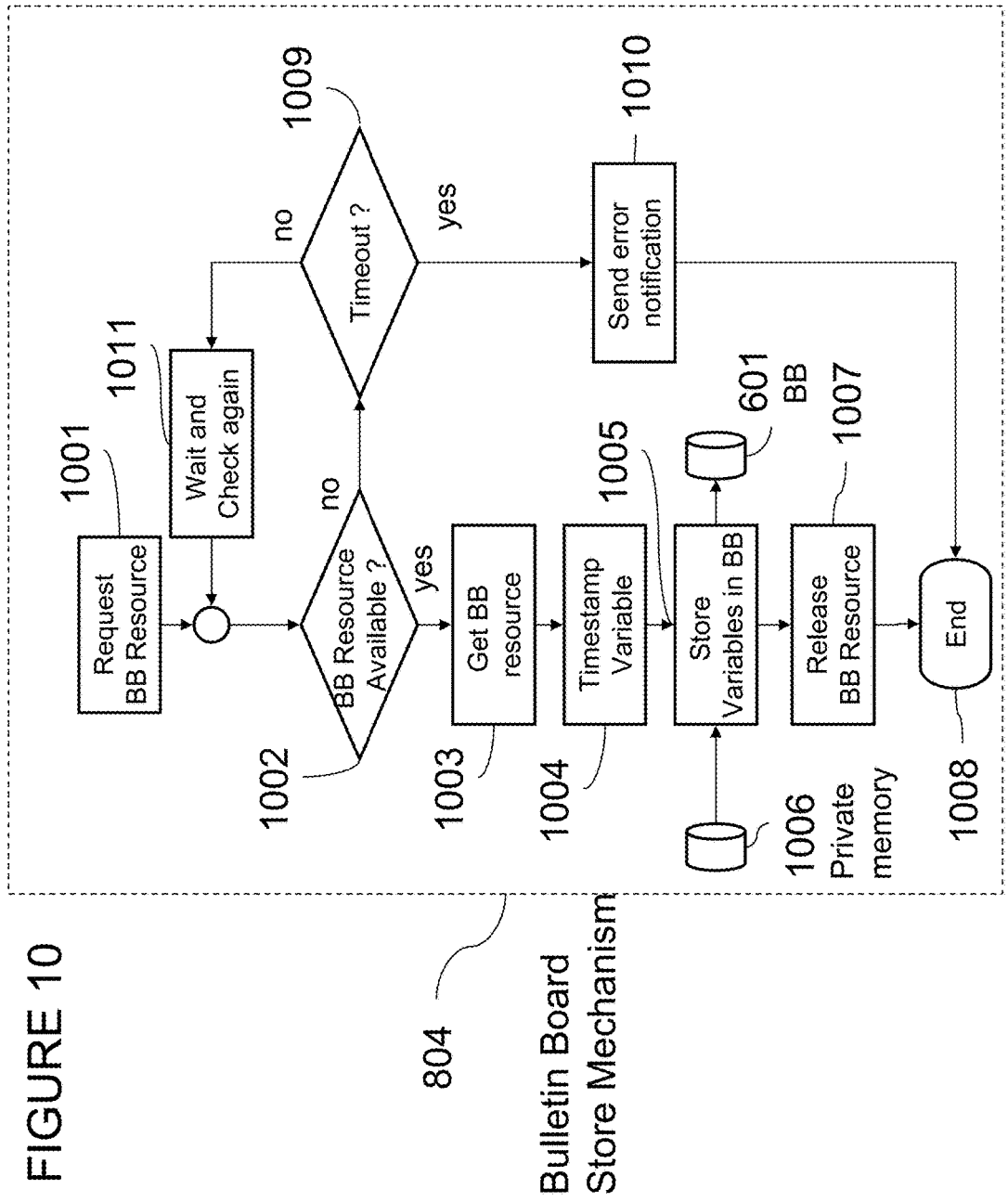
FIG. 10 is a flow chart diagram of an embodiment of the variable method of one embodiment.

FIG. 10 describes the bulletin board store procedure (804) in more detail. Before new data can be stored in the bulletin board, the procedure has to request the access right to the common resource, a section of the non-volatile or volatile memory, from the operating system (1001). This is called explicit resource management.

If the resource is available, the process gets the resource. If the resource is not available, it may try it again after a waiting period (1011) until the resource is available. After a certain time has elapsed (1009) beyond a configurable threshold, the temporal behavior of the state variable can't be captured any longer and the middle-ware may send an error notification to the associated process.

After reserving the resource (1003), the bulletin board store mechanism (804) timestamps the state variable for future temporal reference (1004). Then, the bulletin board store procedure (804) copies the variables or parameters from its private memory (1006) to the shared bulletin-board memory (601). Then it releases the bulletin board resource.

In an alternate embodiment, the bulletin board store procedure (804) has exclusive access to the bulletin board (601) and does not need operations 1002, 1003, 1007, 1009, 1010, and 1011 because the resource access is realized through implicit resource management. This can be achieved with either static task scheduling or by allowing only the bulletin board store procedure (804) to access the bulletin board (601).

Figure 11:
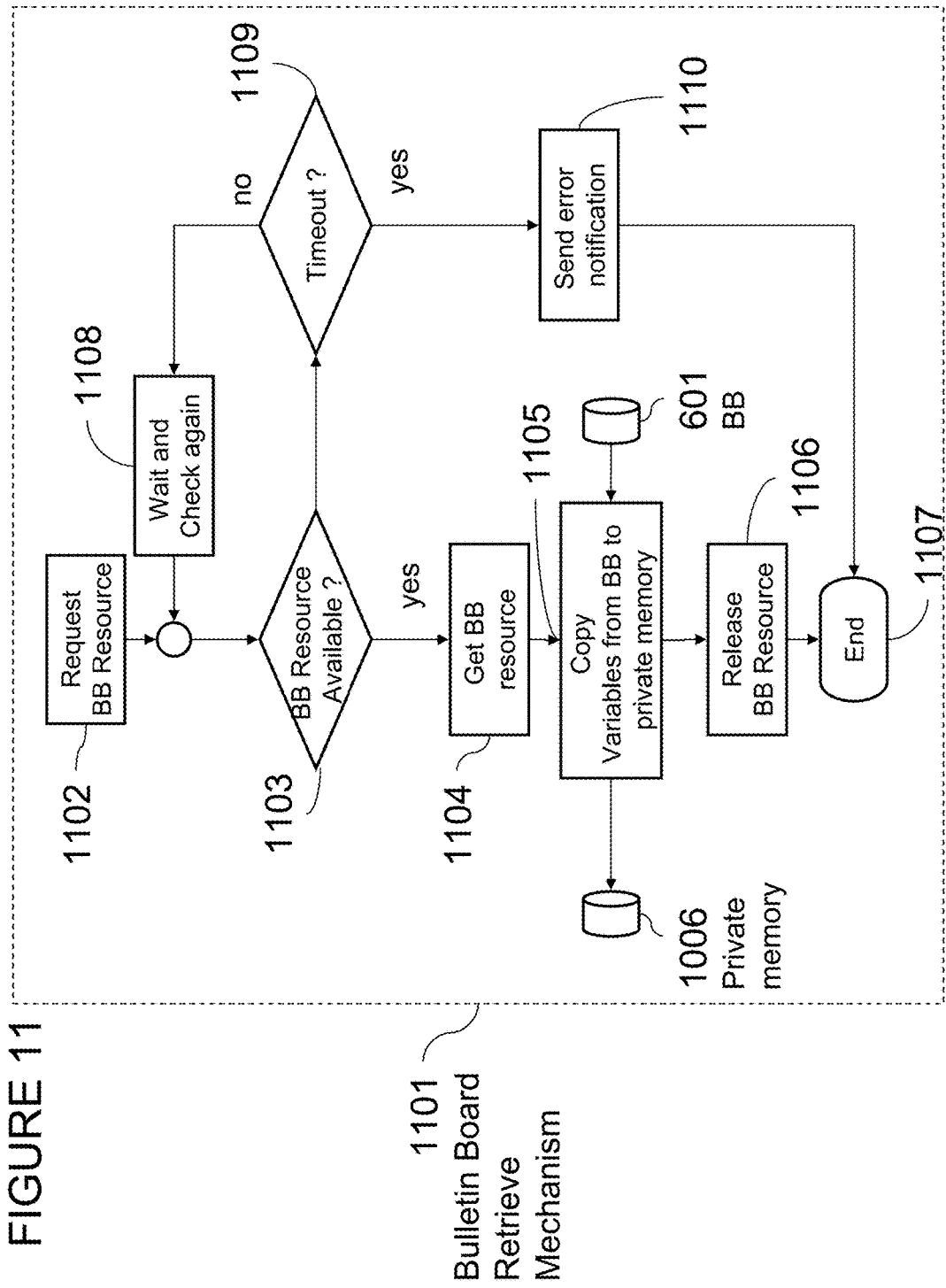
FIG. 11 is a flow chart diagram of an embodiment of the variable retrieve method of one embodiment.

FIG. 11 describes the bulletin board retrieve procedure (1101) in more detail. Before data can be retrieved from the bulletin board, the procedure has to request the access right to the common resource, a section of the non-volatile or volatile memory, from the operating system (1102).

If the resource is available, the process gets the resource. If the resource is not available, it may try it again after a waiting period (1108) until the resource is available. After a certain time has elapsed (1109) beyond a configurable threshold, the temporal behavior of the state variable can't be captured any longer and the middle-ware may send an error notification to the associated process (1110).

After reserving the resource (1104), the bulletin board retrieve mechanism (1101) copies the variables or parameters from the shared bulletin-board memory (601) to its private memory (1006). Then, it releases the bulletin board resource. In an alternate embodiment the bulletin board retrieve procedure (1101) has exclusive access to the bulletin board (601) and does not need operations 1103, 1104, 1106, 1108, 1109, and 1110. Because the resource access is realized through implicit resource management, this can be achieved with either static task scheduling or by allowing only the bulletin board retrieve procedure (1101) to access the bulletin board (601).

Figure 12:
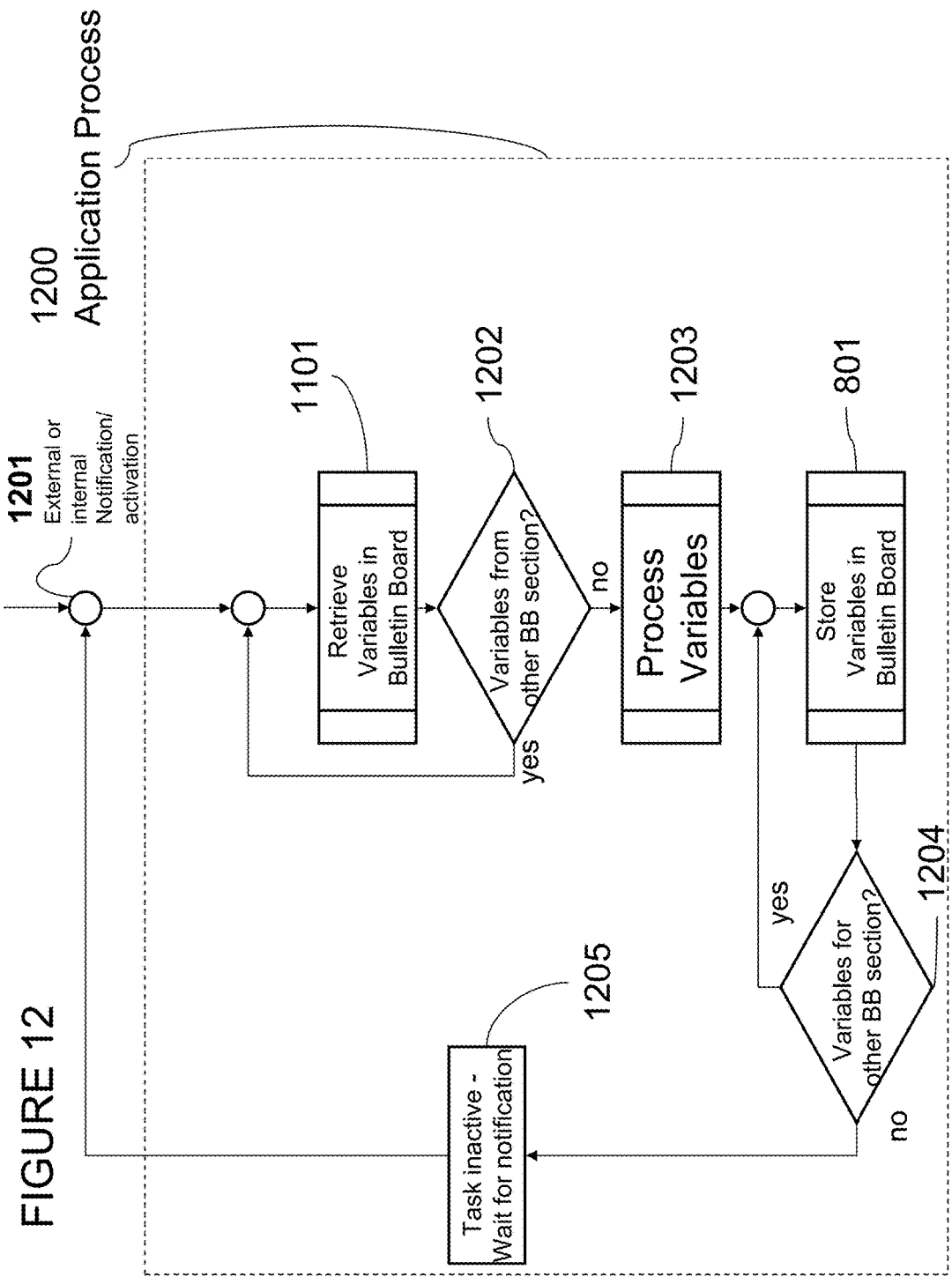
FIG. 12 is a flow chart diagram of an embodiment of the application process using the method of one embodiment.

Referring to FIG. 12, the application process (1200) utilizes the bulletin board retrieve mechanism (1101) to access all parameters, events, and real-time variables from the bulletin board. Thus the application process is decoupled from the temporal behavior of the input/output variables and can be triggered by a plurality of events (1201).

The application process may retrieve one or multiple sets of variables stored in a plurality of memory sections. Then the application process processes the variables (1203) with its method. Because the method is not tied to the location of the input/output variables, the application process can be moved or replicated to a plurality of processing nodes (ECUs or Gateways). After processing the input variables and generating a set of output variables, the application process uses the bulletin board store method (801) to update one or a plurality of memory sections in the bulletin board. If the application process is a cyclic procedure, it waits until the next activation occurs (1205).

Figure 13:
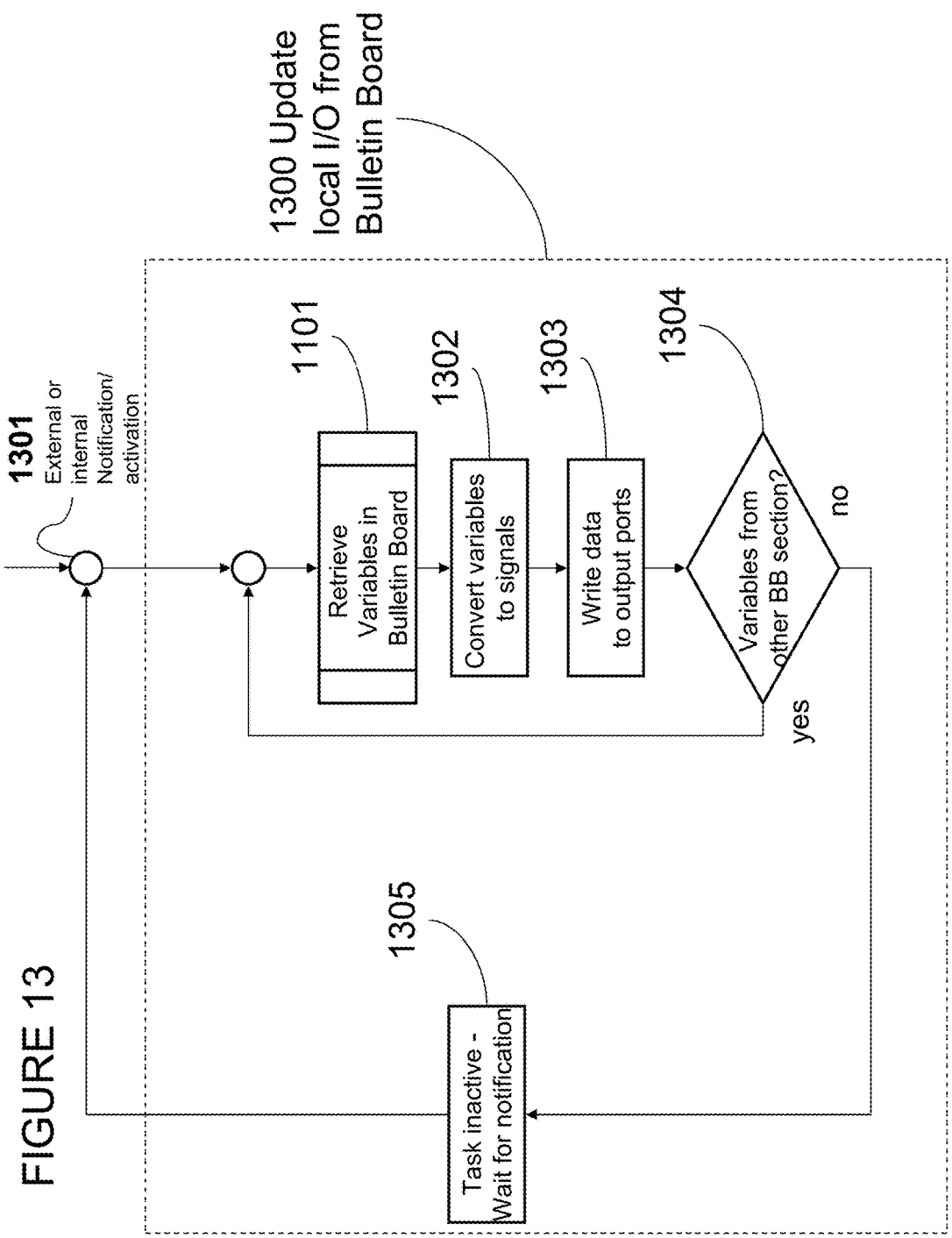
FIG. 13 is a flow chart diagram of an embodiment of the local I/O update from bulletin board method of one embodiment.

Continuing with FIG. 13, the update local I/O from bulletin board process (1300) utilizes the bulletin board retrieve mechanism (1101) to access real-time variables from the bulletin board and convert them to output signals (1302) that can be written to the output port (1303). The I/O update process may retrieve one or multiple sets of variables stored in a plurality of memory sections. If the I/O update process is a cyclic procedure, it waits until the next activation occurs (1305).

Figure 14:
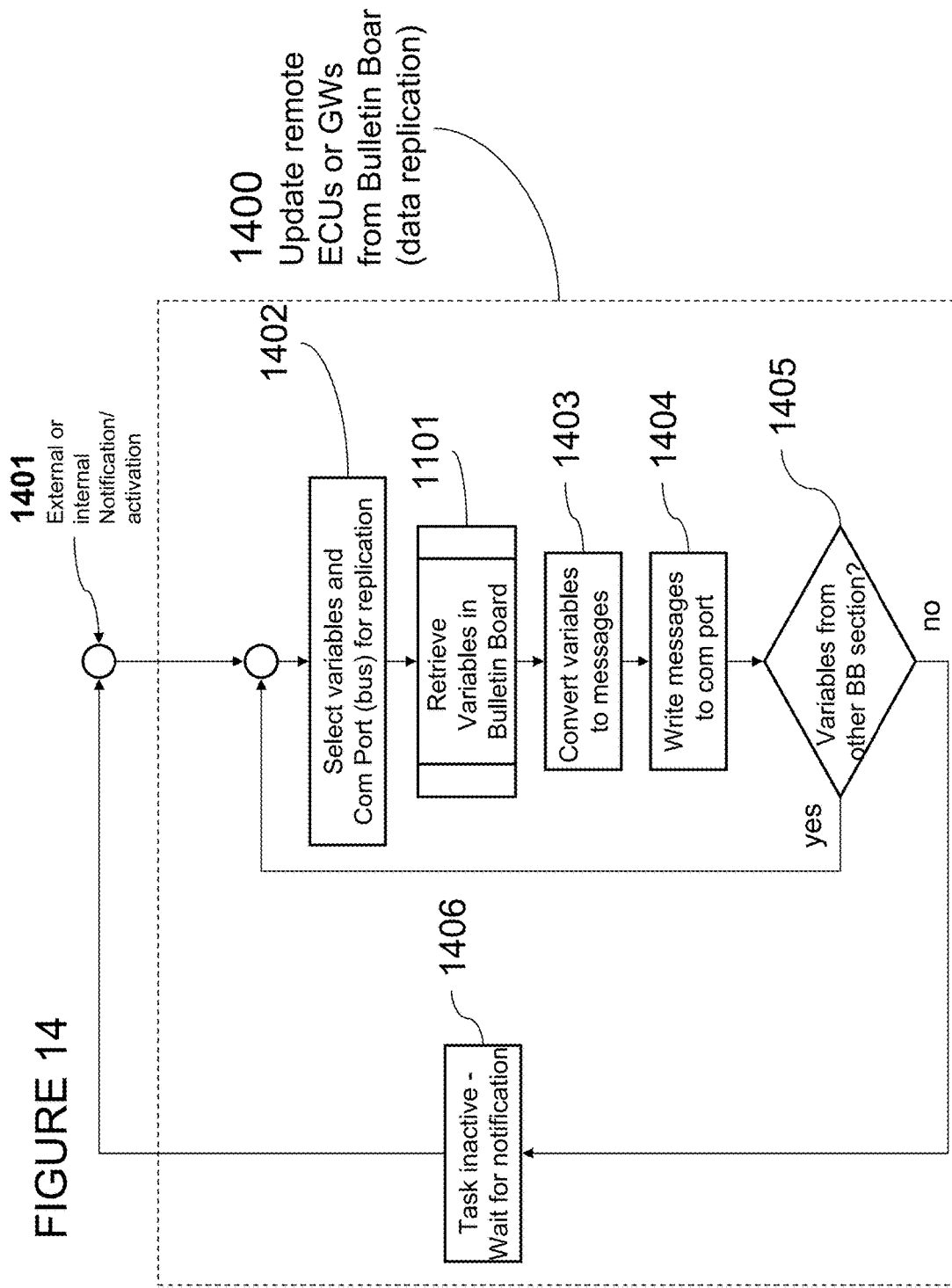
FIG. 14 is a flow chart diagram of an embodiment of the variable replication method of one embodiment.

FIG. 14 describes the data replication process (1400). This process can be triggered by a plurality of notification mechanisms, such as events, alarm signals, internal and external timers, and flags set in the bulletin board. It then selects a subset of variables to be replicated and a communication port (1402). Next it retrieves the variables from the bulletin board with mechanism (1401) and assembles the messages for the specific communication link (1403). The message may include an address or identification number for all bulletin boards and associated processing nodes (ECUs and Gateways).

Finally, it writes the messages to the communication port (1404). In an alternate embodiment, it handles the messages to the associated interface procedure of the operating system. Then it repeats the procedure, until all variables are updated on all communication ports. If the data replication process is a cyclic procedure, it waits until the next activation occurs (1405).

Figure 15:
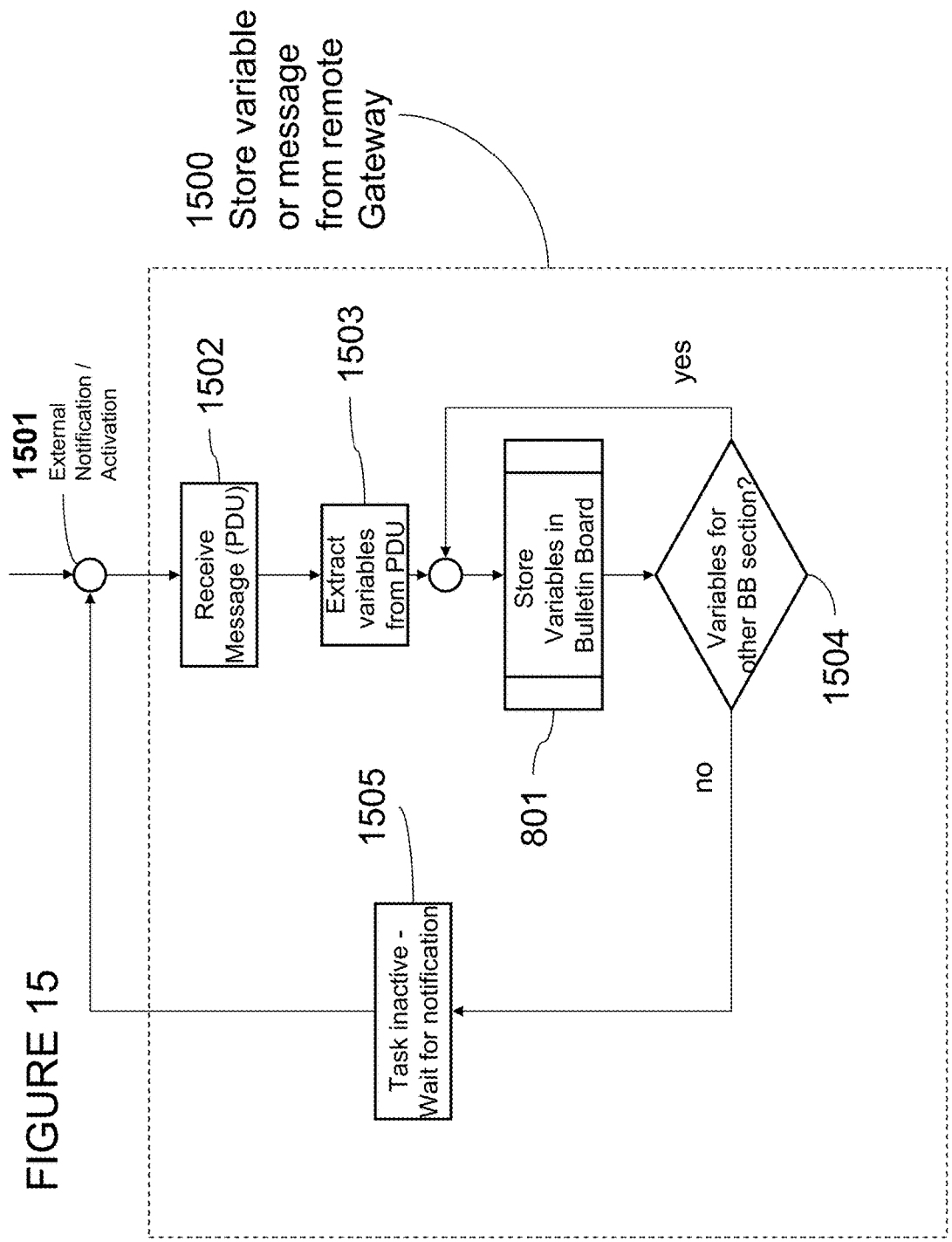
FIG. 15 is a flow chart diagram of an embodiment of the message store from remote gateway method of one embodiment.

Referring now to FIG. 15, the store message from remote processing node (gateway or ECU) process (1500) describes how replicated data is stored in the bulletin board. This process can be triggered by a plurality of notification mechanisms, such as internal or remote events, alarm signals, internal and external timers, and flags set in the bulletin board. The communication bus may also issue these notifications. The process (1500) then reads a message from the communication port (1502), selects a subset of variables to be replicated (1503), and stores the variables in the bulletin board with procedure (801). In an alternate embodiment, this procedure may also be used to store a packet data unit (PDU) in the bulletin board for later replication on the same or a different communication link.

This store and forward networking mechanism can be implemented without the need for complex networking protocols and is therefore well suited for limited processing power and memory environments. It also works in soft-real time environments when no strict temporal behavior is required. The data store operation (801) may be repeated for a plurality of bulletin board sections. If the data replication process is a cyclic procedure, it waits until the next activation occurs (1505).

Figure 16:
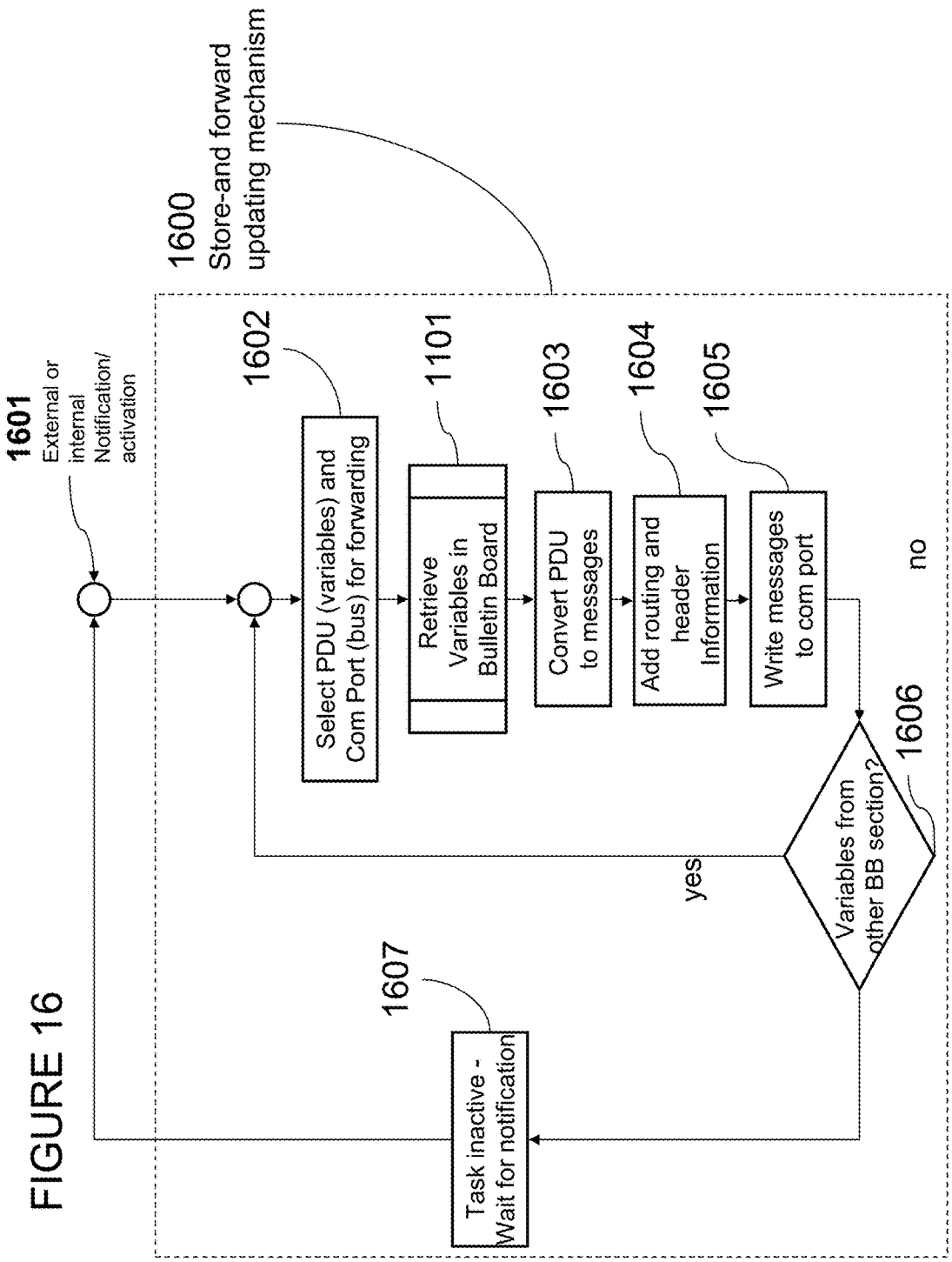
FIG. 16 is a flow chart diagram of an embodiment of the message forward to remote ECU or Gateway method of one embodiment.

Continuing now with FIG. 16, the store and forward updating mechanism (1600) replicates messages from remote processing nodes to other processing nodes from stored packet data units in the bulletin board. This process can be triggered by a plurality of notification mechanisms (1601), such as internal or remote events, alarm signals, internal and external timers, and flags set in the bulletin board. The communication bus may also issue these notifications.

The process (1600) then selects a message to be forwarded (1602) and the appropriate communication link and retrieves the PDU with the bulletin board retrieve mechanism (1101). It then adds the appropriate messages header for the communication link (1603) and may add routing information (1604). Finally the update process (1600) writes the messages to the communication port (1605). If the updating process is a cyclic procedure, it waits until the next activation occurs (1607).

Figure 17:
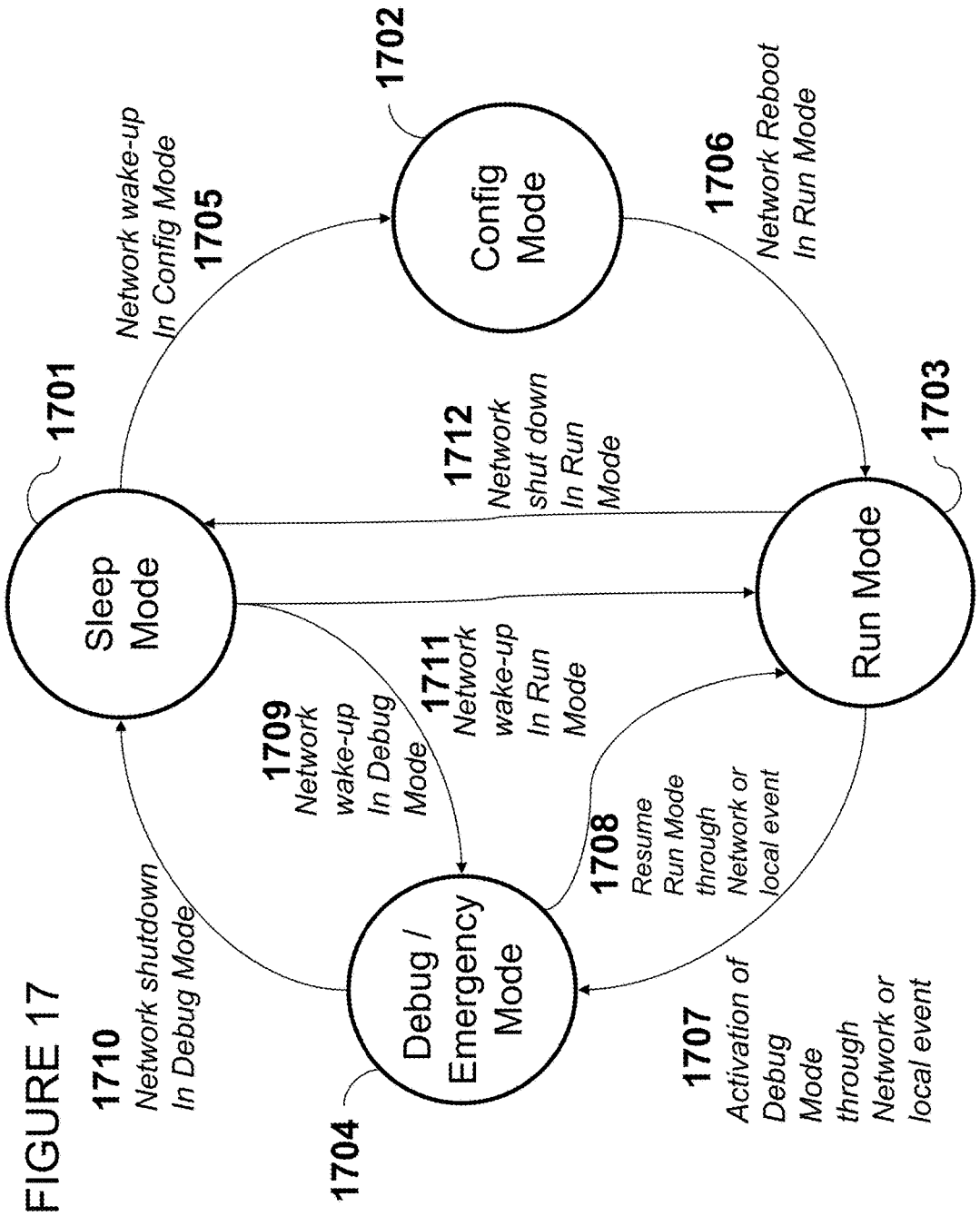
FIG. 17 is a state transition diagram of an embodiment of the mode switching method of one embodiment.

FIG. 17 describes the various modes that the distributed communications and computing system (100) can be operated in. In one embodiment, the system operates in various distinct modes in order to preserve the integrity of the system and still allow for changing the architecture and behavior of the network or the roles of the individual nodes. When the distributed computing and communication system wakes up from the sleep mode (1701), it can enter a configuration and upgrade mode (1702), an emergency or debug mode (1704), or the normal real-time run mode (1703). The root node or system gateway in a distributed communication and computing system defines the mode based on the existence of external events, such as an external control command, internal events, a system failure, or failed integrity check.

Referring now to FIG. 1, the external commands may be generated from a development tool (122) or a remote device (132) that is connected via a remote gateway (131). In an alternate embodiment, each ECU (102) or virtual ECU (115) can trigger the system to enter a different operating mode.

Continuing with FIG. 17, in the configuration mode (1702), the system software and the information-sharing configuration can be updated via a secure communication link with encrypted commands Each processing node (ECU or gateway) may have security mechanisms such as a certificate that allows it to identify and authorize another entity (remote gateway, remote ECU, or development tool) to make changes to its bulletin board parameters.

The remote entity may also download a new firmware to the bulletin board. The ECU or gateway can store this new firmware in its non-volatile memory while it backs up the original image on the bulletin board for the case that the new software is not functional. In the update mode, the distributed system can also reconfigure the communication and computing infrastructure based on a new set of parameters that need to be stored in the individual bulletin boards.

In the normal run mode (1703), the system operates in the real-time information sharing mode and network configuration and certain parameters can't be changed. That protection allows defining deterministic temporal behavior on all communication links. But any processing node may enter a debug/emergency mode (1704) if a failure or other qualifying event occurs.

In the emergency mode, a processor executes an alternate procedure that maintains the temporal behavior on the communication links but may reduce or increase the amount of information shared with other processors. It also lets other processing nodes check on the integrity of sensors and actuators. In the maintenance and upgrade mode, an external system can upgrade executable code images and the bulletin-board configuration via secure communication links.

A system and method are thus provided for sharing information within a distributed embedded communications and computing system and with components outside the embedded system. The information sharing mechanism relies on a bulletin board that may include a small database operating under hard real-time conditions with minimal delays, communication latency, and jitter. The embedded database or bulletin board isolates a real-time application in a Electronic Control Unit (ECU) from various other real time applications and from input output signals in the same module (local information sharing), from event-triggered communications with applications in other modules, and from time-triggered communications with applications in other modules.

One design criteria of the database is that the temporal behavior of communications does not impact the real-time computing task and provides enough information access performance at peak time demand Typically, distributed embedded systems consist of a static structure that can be analyzed at design time. In addition to the real-time operation, the proposed method for information sharing also provides access to the parameters of the embedded system and allows for software upgrades of certain modules.

The present embodiment addresses the shortcomings of traditional computer networks with following enhancements:

1) The concept of multi-mode storage that links two or more communication networks via a bulletin board. The bulletin board is a multi-mode storage that can be thought of an extension to shared memory that can be accessed by local and remote processes at attached networks. There may be multiple hierarchical layers of bulletin boards depending on the topology of the communication system. The bulletin board increases the network efficiency by reducing the number of transactions needed to access remote variables.

2) The concept of a direct-access bulletin board that does not require a network layer translation of messages on each node of the network. Even though this approach restricts the reach of each node to only adjacent nodes and the next gateway, this still allows cross-network variable sharing though vertical real-time replication of data.

3) The concept of hierarchical bulletin board management that allows restriction of information access to certain levels in a network, but still allows the replication of information to other nodes in the network. This paradigm follows the path of reducing the information amount from the leaves of the network to central control and diagnosis hubs.

4) The concept that a gateway can host an assembly of bulletin boards or embedded database that allows operations on bulletin boards to generate events for associated processes. This extension allows definition of a set of data processing operations that would be done once in a network and would be instantly available for connected nodes. Examples for operations are sensor data state observers, diagnostics, integrity checks, fail-safe mechanisms, etc.

5) The concept that an embedded communication and computing network can run in multiple modes in order to provide for a guaranteed deterministic behavior of the system. This property can be achieved by only allowing change to the configuration and/or the functions (SW code) in a secured configuration and upgrade mode. If the network is booted in the normal operating mode, all processors execute the existing code and only allow data sharing through the bulletin boards. The emergency or debug mode lets the network run in a fail-safe reduced operation mode or in a diagnostic mode that allows inspection of the system, while it is running. For each operating mode, the gateway can store a processing image on the bulletin board. The advantage of this procedure is that only the communication hubs need to deal with secure data transfer and encryption while the peripheral nodes in the network can be relative simple in design.

6) The concept of designing the topology of a distributed computing and communication system independent of the definition of the individual functions that the network performs. Each processing task is only associated with a bulletin board, but isolated from I/O processing.

Of course, these are all optional embodiments/enhancements.

While various embodiments have been described above, it should be understood that they have been presented by the way of example only, and not limitation. Thus, the breadth and scope of a preferred embodiment should be not limited by any of the above described exemplary embodiments, but should be defined only in accordance with the following claims and their equivalents.

What is claimed is:

1. A layered system for sharing information in an automobile vehicle, said system comprising:
an automotive electronic control unit comprising a microprocessor and an operating system;
a hardware abstraction layer within the electronic control unit allowing the operating system to be adapted to a specific hardware implementation as used in the electronic control unit;
non-volatile memory comprising a database with a data structure;
a memory manager associated with the non-volatile memory, said memory manager comprising an upgrade and configuration manager to configure the data structure of the non-volatile memory, an event manager to capture input-output events as variables and generate new events, flags or signals, a data access manager to control code update and configuration of the memory and access rights for individual applications at execution, and a data integrity component to analyze stored state variables for integrity and generate events or flags if any problem occurs;
the non-volatile memory further comprising instructions to:
receive information in the form of a packet data unit representing datum information carried by an overall message from a first physical network selected from the group consisting of FlexRay, Controller Area Network, and Local Interconnect Network;
in response to the receipt of the information, issue a storage resource request in connection with a storage resource;
determine whether the storage resource is available for storing the information;
determine whether a threshold has been reached in association with the storage resource request;
in the event the storage resource is not available and the threshold associated with the storage resource request has not been reached, issue another storage resource request in connection with the storage resource;
in the event the storage resource is available, store the information in the storage resource; and
share the stored information with at least one of a plurality of heterogeneous processes including at least one process associated with a second physical network selected from the group consisting of FlexRay, Controller Area Network, and Local Interconnect Network, utilizing a network protocol different from a protocol of the first physical network;
interfaces for communication with each of FlexRay, Controller Area Network, and Local Interconnect Network networks, with each physical network in communication with a component including at least one of a sensor, an actuator, or a gateway, and with each of the FlexRay, Controller Area Network, and Local Interconnect Network interfaces comprising a corresponding network communication bus controller including a corresponding network communication bus driver;
the interfaces including a first communication interface for interfacing with the first physical network, the first communication interface including a first communication interface-related data link layer component, said first communication interface configured to extract variables from the overall message communicated by the first physical network employing a first protocol and storing the packet data unit representing the datum information carried by the overall message from a first physical network in the database; and
a second communication interface for interfacing with the second physical network utilizing a protocol different than the protocol of the first physical network, the second communication interface including a second communication interface-related data link layer component;

wherein the automotive electronic control unit is configured such that the stored information may be shared with the second physical network by replicating the packet unit data obtained from the first physical network by composing another message configured to be communicated using the different protocol of the second physical network.

2. The system of claim 1, wherein the memory comprises at least one bulletin board that stores information that may be addressed by any process of any network having access to the storage resource of the electronic control unit.

3. The system of claim 2, wherein a complexity of the bulletin board grows linearly with a number of networks.

4. The system of claim 1, wherein the electronic control unit comprises code for the electronic control unit to run in a diagnostic mode that allows inspection of the system, while the electronic control unit is running.

5. The system of claim 4, wherein the electronic control unit comprises code for the electronic control unit to additionally run in a debugging mode.

6. The system of claim 1, wherein at least one of the first and the second physical networks is a multiplexing bus.

7. The system of claim 1, wherein each of the first and the second physical networks is a multiplexing bus.

8. The system of claim 1, wherein neither the first nor the second physical network is a multiplexing bus.

9. The system of claim 1, wherein the automotive electronic control unit comprises digital input/output, an analog to digital converter, and a digital to analog converter.

10. The system of claim 1, wherein the automotive electronic control unit comprises a real time clock and a watchdog.

11. The system of claim 2, wherein the electronic control unit comprises:
   code for the electronic control unit to run in a diagnostic mode that allows inspection of the system, while the electronic control unit is running;
   code to run in a debugging mode;
   code to interface with each of a FlexRay multiplexing bus, a Controller Area Network multiplexing bus, and a Local Interconnect Network multiplexing bus;
   digital input/output, an analog to digital converter, and a digital to analog converter;
   a real time clock;
   a watchdog; and
   wherein in the event the storage resource is not available and the threshold associated with the storage resource request has been reached, the electronic control unit is configured to send a notification to a process associated with the information.

12. A layered system for sharing information in an automobile vehicle, said system comprising:
   an automotive electronic control unit comprising a microprocessor and an operating system;
   a hardware abstraction layer within the electronic control unit allowing the operating system to be adapted to a specific hardware implementation as used in the electronic control unit;
   non-volatile memory comprising a database with a data structure;
   a memory manager associated with the non-volatile memory, said memory manager comprising an upgrade and configuration manager to configure the data structure of the non-volatile memory, an event manager to capture input-output events as variables and generate new events, flags or signals, a data access manager to control code update and configuration of the memory and access rights for individual applications at execution, and a data integrity component to analyze stored state variables for integrity and generate events or flags if any problem occurs;
   the non-volatile memory further comprising instructions to:
      receive information in the form of a packet data unit representing datum information carried by an overall message from a first physical network selected from the group consisting of FlexRay, Controller Area Network, Local Interconnect Network and Media Oriented Systems Transport;
      in response to the receipt of the information, issue a storage resource request in connection with a storage resource;
      determine whether the storage resource is available for storing the information;
      determine whether a threshold has been reached in association with the storage resource request;
      in the event the storage resource is not available and the threshold associated with the storage resource request has not been reached, issue another storage resource request in connection with the storage resource;
      in the event the storage resource is available, store the information in the storage resource; and
      share the stored information with at least one of a plurality of heterogeneous processes including at least one process associated with a second physical network selected from the group consisting of FlexRay, Controller Area Network, Local Interconnect Network and Media Oriented Systems Transport, utilizing a network protocol different from a protocol of the first physical network;
   interfaces for communication with each of FlexRay, Controller Area Network, and Local Interconnect Network networks, with each physical network in communication with a component including at least one of a sensor, an actuator or a gateway, and with each of the FlexRay, Controller Area Network, Local Interconnect Network and Media Oriented Systems Transport interfaces comprising a corresponding network communication bus controller including a corresponding network communication bus driver;
   the interfaces including a first communication interface for interfacing with the first physical network, the first communication interface including a first communication interface-related data link layer component, said first communication interface configured to extract variables from the overall message communicated by the first physical network employing a first protocol and storing the packet data unit representing the datum information carried by the overall message from a first physical network in the database; and
   a second communication interface for interfacing with the second physical network utilizing a protocol different than the protocol of the first physical network, the second communication interface including a second communication interface-related data link layer component;
   wherein the automotive electronic control unit is configured such that the stored information may be shared with the second physical network by replicating the packet unit data obtained from the first physical network by composing another message configured to be communicated using the different protocol of the second physical network.

13. The system of claim 12, wherein the memory comprises at least one bulletin board that stores information that may be addressed by any process of any network having access to the storage resource of the electronic control unit.

14. The system of claim 13, wherein a complexity of the bulletin board grows linearly with a number of networks.

15. The system of claim 12, wherein the electronic control unit comprises code for the electronic control unit to run in a diagnostic mode that allows inspection of the system, while the electronic control unit is running.

16. The system of claim 15, wherein the electronic control unit comprises code for the electronic control unit to additionally run in a debugging mode.

17. The system of claim 12, wherein at least one of the first and the second physical networks is a multiplexing bus.

18. The system of claim 12, wherein each of the first and the second physical networks is a multiplexing bus.

19. The system of claim 12, wherein neither the first nor the second physical network is a multiplexing bus.

20. The system of claim 12, wherein the automotive electronic control unit comprises digital input/output, an analog to digital converter, and a digital to analog converter.

21. The system of claim 12, wherein the automotive electronic control unit comprises a real time clock and a watchdog.

22. The system of claim 12, wherein the electronic control unit comprises:
   code for the electronic control unit to run in a diagnostic mode that allows inspection of the system, while the electronic control unit is running;
   code to run in a debugging mode;
   code to interface with each of a FlexRay multiplexing bus, a Controller Area Network multiplexing bus, a Local Interconnect Network multiplexing bus, and a Media Oriented Systems Transport multiplexing bus;
   digital input/output, an analog to digital converter, and a digital to analog converter;
   a real time clock;
   a watchdog; and
   wherein in the event the storage resource is not available and the threshold associated with the storage resource request has been reached, the electronic control unit is configured to send a notification to a process associated with the information.

23. A system, comprising:
   a first physical network including at least one of a FlexRay network, a Controller Area Network, and a Local Interconnect Network;
   a second physical network including at least one of the FlexRay network, the Controller Area Network, and the Local Interconnect Network; and
   an automotive electronic control unit communicatively coupled to the first physical network and the second physical network, the automotive electronic control unit comprising:
      a first physical network interface including a first network communication bus controller with a first network communication bus driver,
      a second physical network interface including a second network communication bus controller with a second network communication bus driver,
      a micro-processor communicatively coupled to the first physical network interface and the second physical network interface,
      a hardware abstraction layer,
      an operating system configured to be adapted to a specific hardware implementation, utilizing the hardware abstraction layer, and
      a non-volatile memory comprising a data structure and instructions, wherein the micro-processor is configured to cause execution of the instructions to cause the automotive electronic control unit to:
         configure the data structure of the non-volatile memory;
         generate at least one of a new event, a new flag, or a new signal, based on at least one of an input event or an output event;
         control at least one of a code update or a configuration in connection with the non-volatile memory;
         control one or more access rights for one or more applications;
         generate at least one of a problem-related event or a problem-related flag in response to an identification of a problem identified via an analysis of at least one stored state variable;
         receive information in the form of a packet data unit including a datum carried by a received message from the first physical network, utilizing a first network protocol;
         in response to the receipt of the information, issue a storage resource request in connection with a storage resource;
         determine whether the storage resource is available for storing the information;
         determine whether a threshold has been reached in association with the storage resource request;
         in the event the storage resource is not available and the threshold associated with the storage resource request has not been reached, issue another storage resource request in connection with the storage resource;
         in the event the storage resource is available, store the information in the storage resource;
         replicate the stored information;
         compose an outgoing message including the replicated stored information; and
         share the outgoing message with the second physical network, utilizing a second network protocol that is different from the first network protocol.

24. The system of claim 23, wherein the non-volatile memory comprises at least one bulletin board that includes the stored information that is capable of being accessed by any process of any network having access to the electronic control unit.

25. The system of claim 24, wherein a complexity of the bulletin board grows linearly with a number of networks.

26. The system of claim 23, wherein the electronic control unit comprises code to run in a diagnostic mode that allows inspection of the system, while the electronic control unit is running.

27. The system of claim 26, wherein the electronic control unit comprises code to additionally run in a debugging mode.

28. The system of claim 24, wherein the electronic control unit comprises:
   code to run in a diagnostic mode that allows inspection of the system, while the electronic control unit is running;
   code to run in a debugging mode;
   code to interface with each of a FlexRay multiplexing bus, a Controller Area Network multiplexing bus, and a Local Interconnect Network multiplexing bus;

a real time clock;
a watchdog; and
wherein the system is configured such that, in the event the storage resource is not available and the threshold associated with the storage resource request has been reached, the electronic control unit is configured to send a notification to a process associated with the information.

29. The system of claim 24, wherein the system is configured such that at least one of:
the first physical network includes the FlexRay network;
the first physical network includes the Controller Area Network;
the first physical network includes the Local Interconnect Network;
the second physical network includes the FlexRay network;
the second physical network includes the Controller Area Network;
the second physical network includes the Local Interconnect Network;
the new event, the new flag, or the new signal are all generated based on the input event;
only one of the new event, the new flag, or the new signal is generated based on the input event;
the new signal is generated based on the input event;
the new event, the new flag, or the new signal are all generated based on the output event;
only one of the new event, the new flag, or the new signal is generated based on the output event;
the new signal is generated based on the output event;
a single access right is controlled for a single application;
multiple access rights are controlled for multiple applications;
a single access right is controlled for a single application at execution;
multiple access rights are controlled for multiple applications at execution;
both the problem-related event and the problem-related flag are generated in response to the identification of the problem identified via the analysis of at least one stored state variable;
only one of the problem-related event or the problem-related flag is generated in response to the identification of the problem identified via the analysis of at least one stored state variable;
the problem-related event is generated in response to the identification of the problem identified via the analysis of at least one stored state variable;
at least one stored state variable is a single stored state variable; or the at least one stored state variable includes multiple stored state variables.

30. A system, comprising:
an automobile including:
a first physical network including at least one of a FlexRay network, a Controller Area Network, and a Local Interconnect Network;
a second physical network including at least one of the FlexRay network, the Controller Area Network, and the Local Interconnect Network; and
an automotive electronic control unit communicatively coupled to the first physical network and the second physical network, the automotive electronic control unit comprising:
a first physical network interface including a first network communication bus controller with a first network communication bus driver,
a second physical network interface including a second network communication bus controller with a second network communication bus driver,
a micro-processor communicatively coupled to the first physical network interface and the second physical network interface, a hardware abstraction layer,
an operating system configured to be adapted to a specific hardware implementation, utilizing the hardware abstraction layer, and
a non-volatile memory comprising a data structure and instructions, wherein the micro-processor is configured to cause execution of the instructions to cause the automotive electronic control unit to:
configure the data structure of the non-volatile memory,
generate at least one of a new event, a new flag, or a new signal, based on at least one of an input event or an output event,
control at least one of a code update or a configuration in connection with the non-volatile memory,
control one or more access rights for one or more applications,
generate at least one of a problem-related event or a problem-related flag in response to an identification of a problem identified via an analysis of at least one stored state variable,
receive information in the form of a packet data unit including a datum carried by a received message from the first physical network, utilizing a first network protocol,
in response to the receipt of the information, issue a storage resource request in connection with a storage resource,
determine whether the storage resource is available for storing the information,
determine whether a threshold has been reached in association with the storage resource request,
in the event the storage resource is not available and the threshold associated with the storage resource request has not been reached, issue another storage resource request in connection with the storage resource,
in the event the storage resource is available, store the information in the storage resource,
replicate the stored information,
compose an outgoing message including the replicated stored information, and
share the outgoing message with the second physical network, utilizing a second network protocol that is different from the first network protocol.

* * * * *

(12) INTER PARTES REVIEW CERTIFICATE (3190th)
United States Patent (10) Number: US 10,248,477 K1
Fuchs et al. (45) Certificate Issued: Jul. 17, 2023

(54) SYSTEM, METHOD AND COMPUTER PROGRAM PRODUCT FOR SHARING INFORMATION IN A DISTRIBUTED FRAMEWORK

(71) Applicant: Stragent, LLC

(72) Inventors: Axel Fuchs; Scott Sturges Andrews

(73) Assignee: Stragent, LLC

Trial Number:

IPR2021-00417 filed Jan. 21, 2021

Inter Partes Review Certificate for:

Patent No.: 10,248,477
Issued: Apr. 2, 2019
Appl. No.: 16/148,949
Filed: Oct. 1, 2018

The results of IPR2021-00417 are reflected in this inter partes review certificate under 35 U.S.C. 318(b).

INTER PARTES REVIEW CERTIFICATE
U.S. Patent 10,248,477 K1
Trial No. IPR2021-00417
Certificate Issued Jul. 17, 2023

AS A RESULT OF THE INTER PARTES REVIEW PROCEEDING, IT HAS BEEN DETERMINED THAT:

Claims 1-30 are cancelled.

\* \* \* \* \*